US011323815B2

(12) United States Patent
Annamraju

(10) Patent No.: US 11,323,815 B2
(45) Date of Patent: May 3, 2022

(54) GRAPHICAL USER INTERFACE INDICATOR FOR BROADCASTER PRESENCE

(71) Applicant: Google LLC, Mountain View, CA (US)

(72) Inventor: Venu Madhav Annamraju, Telangana (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/968,174

(22) PCT Filed: Dec. 14, 2018

(86) PCT No.: PCT/US2018/065802
§ 371 (c)(1),
(2) Date: Aug. 7, 2020

(87) PCT Pub. No.: WO2020/122949
PCT Pub. Date: Jun. 18, 2020

(65) Prior Publication Data
US 2021/0321197 A1 Oct. 14, 2021

(51) Int. Cl.
*H04R 5/04* (2006.01)
*G01S 5/18* (2006.01)
*G06F 3/16* (2006.01)

(52) U.S. Cl.
CPC .................. *H04R 5/04* (2013.01); *G01S 5/18* (2013.01); *G06F 3/167* (2013.01); *H04R 2420/07* (2013.01)

(58) Field of Classification Search
CPC .................. H04R 5/04; H04R 2420/07; H04R 2227/005; H04R 1/023; G01S 5/18;
(Continued)

(56) References Cited

U.S. PATENT DOCUMENTS 9,054,873 B2   6/2015  Hoornaert et al.
9,569,767 B1   2/2017  Lewis et al.
(Continued)

OTHER PUBLICATIONS

International Search Report for PCT/US2018/065802, dated Jun. 28, 2019, 2 pages.

*Primary Examiner* — Fan S Tsang
*Assistant Examiner* — David Siegel
(74) *Attorney, Agent, or Firm* — Dority & Manning, P.A.

(57) ABSTRACT

During audio pairing with a broadcaster computing device, a receiver computing device receives audio token data broadcast by the broadcaster computing device via audio communication channels and displays a broadcaster computing device status category to the user via a graphical user interface. In some examples, the receiver computing device receives audio token and determines a broadcaster computing device status category based on determining results of a CRC on the received audio token data. In other examples, the receiver computing device determines a signal score for the received audio token data and determines a broadcaster computing device status category based on the value of the signal score as compared to low and high threshold signal scores determined by an account management system based on aggregate signal score data received from multiple receiver computing devices of a same model as the receiver computing device.

20 Claims, 8 Drawing Sheets

(58) Field of Classification Search
CPC ......... G06F 3/167; H04W 4/80; H04W 84/20; H04W 12/50; H04W 76/10; H04W 8/005
See application file for complete search history.

(56) References Cited

U.S. PATENT DOCUMENTS

| | | |
|---|---|---|
| 2013/0185654 A1* | 7/2013 | Harris .................. H04W 76/14 715/753 |
| 2014/0173439 A1* | 6/2014 | Gutierrez .......... G08B 21/0236 715/727 |
| 2015/0031388 A1 | 1/2015 | Chatterjee et al. |
| 2016/0123745 A1 | 5/2016 | Cotier et al. |
| 2016/0232515 A1 | 8/2016 | Jhas et al. |
| 2016/0241910 A1* | 8/2016 | Rowe ................. H04N 21/4126 |
| 2017/0272824 A1* | 9/2017 | Bunner ................ H04W 8/005 |

\* cited by examiner

GRAPHICAL USER INTERFACE INDICATOR FOR BROADCASTER PRESENCE

CROSS REFERENCE TO RELATED APPLICATIONS

This application is based upon and claims the right of priority under 35 U.S.C. § 371 to International Application No. PCT/US2018/065802, titled "Graphical User Interface Indicator for Broadcaster Presence," filed on Dec. 14, 2018. Applicant claims priority to and the benefit of International Application No. PCT/US2018/065802 and incorporates such application herein by reference in its entirety.

TECHNICAL FIELD

The present disclosure relates generally to pairing computing devices via audio communication and more specifically to providing broadcaster computing device status information.

BACKGROUND

Broadcaster devices and receiver devices may be paired in close proximity using near-ultrasound audio-based pairing. Conventionally, a transmission of data in ultrasound audio communications may involve one user on a broadcaster computing device pressing a user interface object and another user on a receiver computing device pressing another interface object. The example waiting time to receive a first audio token may comprise a time window, for example, from 1-20 seconds. For example, the wait time may be one second if the broadcaster computing device is already broadcasting an audio token when the receiver computing device is activated. However, often, each of the users is unaware whether the other party has initiated the transmission of data by actuating the appropriate user interface object on the appropriate user computing device. Consequently, the lack of knowledge by one or both of the users as to whether computing devices are properly configured for an expected data transmission results in excess battery usage and processing by the computing devices as well as wasted time for one or both users.

Current applications for audio-based pairing do not provide a graphical user interface for presenting broadcaster computing device status information during data communication.

SUMMARY

Techniques herein provide computer-implemented methods to present, by a receiver computing device, a graphical user interface providing broadcaster computing device status information during data communication. In an example, a first user computing device receives, from one or more computing devices, an audio token not present signal score threshold determined from aggregate signal score data of one or more second computing devices of a same model as the first computing device. The first user computing device receives audio token data via a microphone component of the first computing device. The first user computing device determines a signal score for the received audio token data. The first user computing device determines whether the signal score for the received audio token data is less than the audio token not present signal score threshold. In response to determining whether the signal score for the received audio token data is less than the audio token not present signal score threshold, the first user computing device displays, via a graphical user interface on the first computing device, one or more outputs indicating a broadcaster computing device status in accordance with the determination of whether the signal score for the received audio token data is less than the audio token not present signal score threshold.

In certain other example aspects described herein, systems and computer program products to present, by a receiver computing device, a graphical user interface providing broadcaster computing device status information during data communication are provided.

These and other aspects, objects, features, and advantages of the examples will become apparent to those having ordinary skill in the art upon consideration of the following detailed description of illustrated examples.

DETAILED DESCRIPTION OF EXAMPLES

Overview

Figure 1:
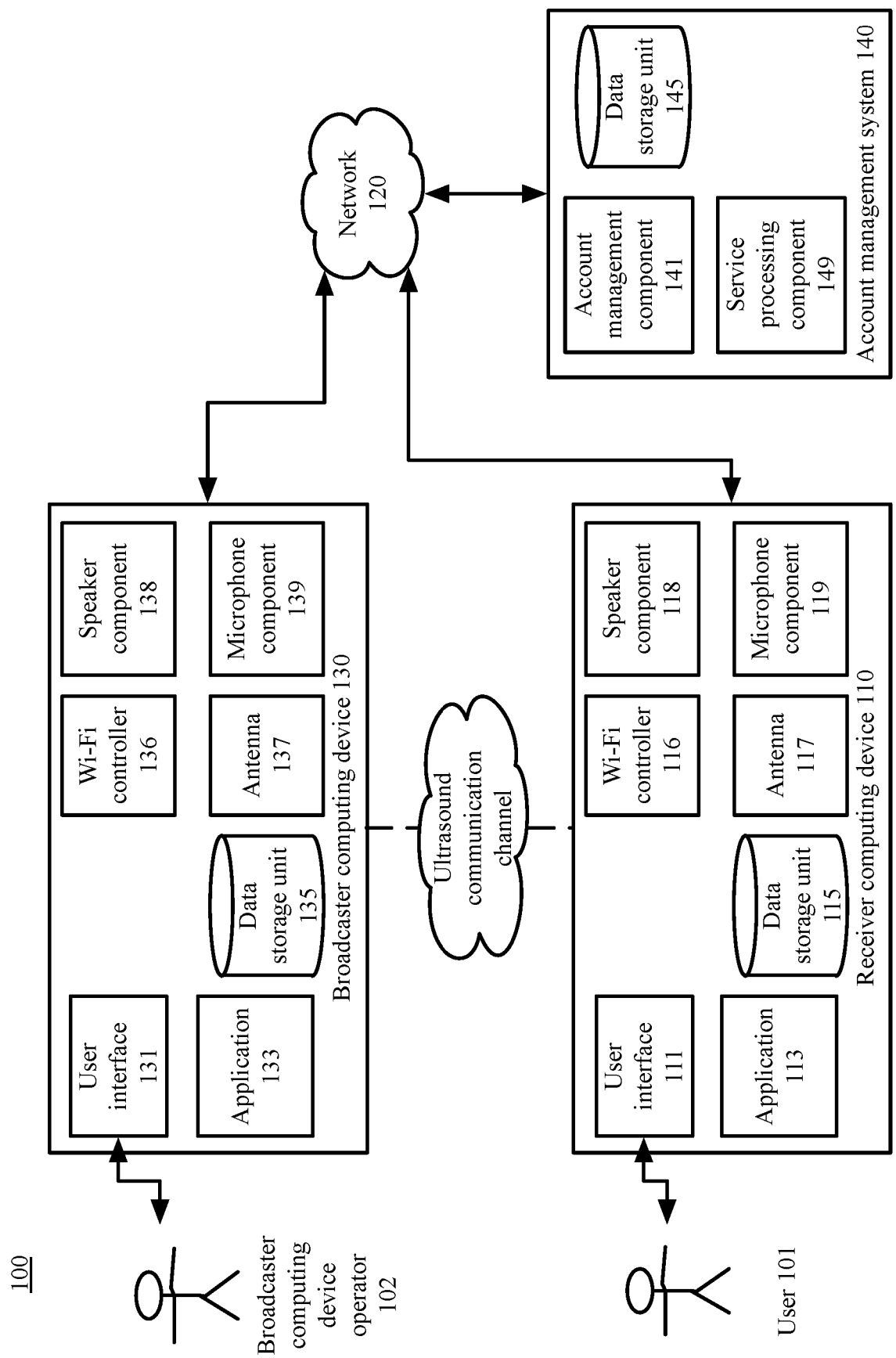
FIG. 1 is a block diagram depicting a system for presenting, by a receiver computing device, a graphical user interface providing broadcaster computing device status information during data communication, in accordance with certain examples.

The examples described herein provide computer-implemented techniques for presenting, by a receiver computing device, a graphical user interface providing broadcaster computing device status information during data communication.

In an example, during audio pairing with a broadcaster computing device, a receiver computing device receives audio token data broadcast by the broadcaster computing device via audio communication channels and displays a broadcaster computing device status category to the user via a graphical user interface. In some examples, the receiver computing device receives audio token and determines a broadcaster computing device status category based on determining results of a CRC on the received audio token data. In other examples, the receiver computing device determines a signal score for the received audio token data and determines a broadcaster computing device status category based on the value of the signal score as compared to low and high threshold signal scores determined by an account management system based on aggregate signal score data received from multiple receiver computing devices of a same model as the receiver computing device. For example, the receiver computing device determines signal scores for received audio token data both before receiving the audio token data (the pre-token phase) and while receiving the audio token data (the token phase). The receiver computing device displays the broadcaster computing device status category via the graphical user interface and the user or broadcaster computing device operator take remedial action when appropriate to ensure success of audio pairing.

In an example, the receiver computing device is paired via audio communication to the broadcaster computing device to share requested data via the account management system over a network. In an example, the broadcaster computing device generates a service request identifier, transmits the generated service request identifier to the account management system via the network, and broadcasts an audio token via ultrasound communication or audible sound communication comprising the service request identifier. In other examples, the broadcaster computing device requests a service request identifier from the account management system, receives a service request identifier from the account management system, and broadcasts the audio token comprising the received service request identifier. In an example, the receiver computing device receives audio token data from the broadcaster computing device via audio communication channels. In examples described herein, the receiver computing device displays, as it receives or attempts to receive audio token data, a graphical user interface that displays a broadcaster computing device status. In an example, a broadcaster computing device status comprises one of a strong broadcaster device presence status, a weak broadcaster device presence status, a broadcaster device probably present status, a broadcaster device probably absent status, a broadcaster device absent status, and other applicable broadcaster device status indicating a state of a broadcaster computing device.

In certain examples in which the receiver computing device receives, via the microphone component of the receiver computing device, one or more audio tokens broadcast by the broadcaster computing device, the receiver computing device displays, via the graphical user interface, either a strong broadcaster device presence status or a weak broadcaster device presence status. n this example, if the receiver computing device performs a CRC on at least one of the received multiple successive audio tokens and determines no errors from the CRC, the receiver computing device displays a strong broadcaster device presence status. However, the receiver computing device, in response to determining that there are one or more errors in the received audio token resulting from the CRC performed on a received audio token, displays a weak broadcaster device presence status via the graphical user interface. In an example, the user associated with the receiver computing device or the broadcaster computing device operator, in response to viewing the weak broadcaster device presence status displayed via the graphical user interface, moves the receiver computing device physically closer to the broadcaster computing device.

In certain examples in which the receiver computing device does not receive any audio tokens broadcast by the broadcaster computing device, the receiver computing device displays, via the graphical user interface, a broadcaster device probably present status, a broadcaster device probably absent status, or a broadcaster device absent status. In certain examples, the receiver computing device, in response to not receiving an audio token, determines a current broadcaster signal score, and determines a broadcaster device status based on the position of the current broadcaster signal score with respect to audio token present and audio token absent signal score thresholds determined by the account management system. In an example, the account management system, based on aggregate signal score data for the multiple past audio pairings for devices of a same model as the receiver computing device, a pre-token phase baseline probability curve and a token phase baseline probability curve. The account management system computing device determines an audio token present threshold signal score equal to a first predetermined probability. The account management system determines an audio token absent threshold signal score along the pre-token phase probability curve equal to a second predetermined probability. If the receiver computing device determines that the current signal score for the broadcaster computing device is greater than the determined audio token present threshold signal score, the receiver computing device displays, via the graphical user interface, a broadcaster device probably present status asking the user should move the receiver computing device closer to the broadcaster computing device to increase the quality of the received audio token data. In a second example, if the determined current signal score for the broadcaster computing device is less than the determined audio token absent threshold signal score, the receiver computing device displays, via the graphical user interface, a broadcaster computing device absent status asking the user to request a broadcaster computing device operator to configure the broadcaster computing device to broadcast audio token data to enable audio pairing. In a third example, if the determined current signal score for the broadcaster computing device is greater than the determined audio token absent threshold signal score but less than the determined audio token present threshold signal score, the receiver computing device displays, via the graphical user interface, a broadcaster device probably absent status asking the user either to request that a broadcaster computing device operator configure the broadcaster computing device to broadcast audio token data or to move the receiver computing device closer to the broadcaster computing device to increase the quality of the received audio token data.

By using and relying on the methods and systems described herein, the receiver computing device provides the capability to present a graphical user interface providing broadcaster computing device status information during audio data communication. As such, the systems and methods described herein may enable one or more parties attempting to pair two computing devices via audio pairing to know whether each of the computing devices are properly configured for an expected data transmission. Accordingly, the systems and methods described herein, by providing the parties with appropriate status information, results in reduced battery usage and processing from either device unilaterally sending or receiving data for an attempted audio pairing without the participation of the other intended device as well as reduced wasted time for users of such devices unnecessarily waiting on a data transmission that may not be successful under current conditions. By using and relying on the methods and systems described herein, the receiver computing device displays specific categories of broadcaster computing device status to the user during audio data communication based on determining whether an intelligible audio token was received and also based on comparing a determined signal score of the broadcaster computing device against historical signal score data known to be logged either during audio token reception or before audio token reception in previous audio pairings of receiver devices of the same model as the receiver device being paired. As logged aggregate signal score data changes over time, the systems and methods described herein may enable dynamic determination of thresholds for broadcaster computing device status categories. Accordingly, the systems and methods described herein, by providing the parties with specific status information for a particular audio pairing, enable users to receive specific direction to take remedial measures to either initiate a new audio pairing or remedy the current audio pairing so that it may proceed to completion, reducing time wasted on ineffective or unnecessary remedial measures as well as reducing battery usage and processing of the computing devices by lessening the amount of troubleshooting required.

Example System Architecture

Turning now to the drawings, in which like numerals indicate like (but not necessarily identical) elements throughout the figures, examples are described in detail.

FIG. 1 is a block diagram depicting a system 100 for configuring, by an account management system 140, a receiver computing device 110 during audio pairing with a broadcasting computing device 130, in accordance with certain examples. As depicted in FIG. 1, the system 100 includes network computing devices 110, 130, and 140 that are configured to communicate with one another via one or more networks 120. In some examples, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), ultrasound communication, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 120. For example, each network computing device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example depicted in FIG. 1, the network computing devices 110, 130, and 1340 are operated by users 101, broadcaster computing device operators 102, and account management system 140 operators, respectively.

In certain examples, two computing devices comprising a receiver computing device 110 and a broadcaster computing device 130 are paired via audio communication. However, in other examples, a first receiver computing device 110 and a second receiver computing device 110 are paired via audio communication. One or more functions described as being performed by the receiver computing device 110 may also be performed by a first user computing device and one or more functions described as being performed by the broadcaster computing device 130 may also be performed by a second user computing device.

An example receiver computing device 110, or first user computing device, comprises a user interface 111, an application 113, a data storage unit 115, a Wi-Fi controller 116, an antenna 117, an audio component 118, and a microphone component 119. An example receiver computing device 110 receives an audio token broadcast by a broadcaster computing device 130, the audio token comprising a service request identifier. In an example, the receiver computing device 110 extracts the service request identifier from the received audio token and transmits the service request identifier to the account management system 140 via the network 120. In an example, receiver computing device 110 receives audio token data broadcast by the receiver computing device 110 via a microphone component 119 and determines a signal score for the received audio token data. In an example, the receiver computing device 110 determines a broadcaster computing device 130 status based on the determined signal score. In an example, the receiver computing device 110 performs a CRC on the received audio token and determines a broadcaster computing device 130 status based on the results of the performed CRC. In an example, the receiver computing device 110 displays, via a user interface 111, the determined broadcaster computing device 130 status.

In an example, the user interface 111 enables the user 101 to interact with the receiver computing device 110. For example, the user interface 111 may be a touch screen, a voice-based interface, or any other interface that allows the user 101 to provide input and receive output from an application on the receiver computing device 110. In an example, the user 101 interacts via the user interface 111 with the application 113.

In an example, the application 113 is a program, function, routine, applet, or similar entity that exists on and performs its operations on the receiver computing device 110. In certain examples, the user 101 must install the application 113 and/or make a feature selection on the receiver computing device 110 to obtain the benefits of the techniques described herein. In an example, the user 101 may access the application 113 on the receiver computing device 110 via the user interface 111. In an example, the application 113 may be associated with the account management system 140.

In an example, the data storage unit 115 comprises a local or remote data storage structure accessible to the receiver computing device 110 suitable for storing information. In an example, the data storage unit 115 stores encrypted information, such as HTML5 local storage. In an example, the receiver computing device 110 stores logged broadcaster computing device 130 signal score data determined during one or more audio pairings.

In an example, the Wi-Fi controller 116 is capable of sending and receiving data, performing authentication and ciphering functions, and directing how the receiver computing device 110 will listen for transmissions from the broadcaster computing device 130 or configuring the receiver computing device 110 into various power-save modes according to Wi-Fi-specified procedures. In another example, the receiver computing device 110 comprises a Bluetooth controller, Bluetooth low energy ("BLE") controller, or an NFC controller capable of performing similar functions. An example Wi-Fi controller 116 communicates with the application 113 and is capable of sending and receiving data over a wireless, Wi-Fi communication channel. In another example, a Bluetooth controller, BLE controller, or NFC controller performs similar functions as the Wi-Fi controller 116 using Bluetooth, BLE, or NFC protocols. In an example, the Wi-Fi controller 116 activates the antenna 117 to create a wireless communication channel between the receiver computing device 110 and the broadcaster computing device 130. For example, the receiver computing device 110 communicates with the broadcaster computing device 130 via the antenna 117. In an example, when the receiver computing device 110 has been activated, the Wi-Fi controller 116 polls through the antenna 117 a radio signal, or listens for radio signals from the broadcaster computing device 130.

In an example, the antenna 117 is a means of communication between the receiver computing device 110 and a broadcaster computing device 130. In an example, a Wi-Fi controller 116 outputs through the antenna 117 a radio signal, or listens for radio signals from the broadcaster computing device 130. In another example a Bluetooth controller or a near field communication ("NFC") controller is used.

In an example, the speaker component 118 comprises a speaker device or other audio device capable of producing an ultrasound output or other audible output. In an example, the speaker component 118 can communicate with the application 113 to receive an instruction to broadcast an ultrasound output. In an example, the speaker component 118 is a component of the receiver computing device 110. In another example, the speaker component 118 is communicatively coupled to the receiver computing device 110.

In an example, the microphone component 119 comprises a microphone device that is capable of receiving ultrasound inputs from an environment of the receiver computing device 110. In an example, the microphone component 119 communicates with the application 113 to receive an instruction to transition from a passive mode to an active mode and listen for ultrasound inputs. In an example, the microphone component 119 receives ultrasound inputs while in the active mode and transmits the received ultrasound inputs to the application 113.

An example broadcaster computing device 130, or second user computing device, comprises a user interface 131, an application 133, a data storage unit 135, a Wi-Fi controller 136, an antenna 137, a speaker component 138, and a microphone component 139. In an example, the broadcaster computing device 130 comprises a mobile computing device such as a smartphone device, tablet device, or other mobile computing device. In another example, the broadcaster computing device 130 comprises a point of sale terminal. An example broadcaster computing device 130 receives a request to complete audio pairing with a receiver computing device 110, requests a service request identifier from the account management system 140 via the network 120, receives the service request identifier from the account management system 140, and generates an audio token comprising the service request identifier. In this example, the broadcaster computing device 130 broadcasts, via a speaker component, the generated audio token via one or more audio communication channels. In this example, broadcaster computing device 130 completes audio pairing with a receiver computing device 110 that receives the broadcast audio token, extracts the service request identifier, and retransmits the service request identifier to the account management system 140 via the network 120. In an example, the broadcaster computing device 130 transmits data and/or receives data from the receiver computing device 110 via the account management system 140 over the network 120.

In an example, the user interface 131 enables the broadcaster computing device operator 102 to interact with the broadcaster computing device 130. For example, the user interface 131 may be a touch screen, a voice-based interface, or any other interface that allows the broadcaster computing device operator 102 to provide input and receive output from an application on the broadcaster computing device 130. In an example, the broadcaster computing device operator 102 interacts via the user interface 131 with the application 133.

In an example, the application 133 is a program, function, routine, applet, or similar entity that exists on and performs its operations on the broadcaster computing device 130. In certain examples, the broadcaster computing device operator 102 must install the application 133 and/or make a feature selection on the broadcaster computing device 130 to obtain the benefits of the techniques described herein. In an example, the broadcaster computing device operator 102 may access the application 133 on the broadcaster computing device 130 via the user interface 131. In an example, the application 133 may be associated with the account management system 140.

In an example, the data storage unit 135 comprises a local or remote data storage structure accessible to the broadcaster computing device 130 suitable for storing information. In an example, the data storage unit 135 stores encrypted information, such as HTML5 local storage. In an example, the broadcaster computing device 130 stores a generated service request identifier in the data storage unit 135.

In an example, the Wi-Fi controller 136 is capable of sending and receiving data, performing authentication and ciphering functions, and directing how the broadcaster computing device 130 will listen for transmissions from the receiver computing device 110 or configuring the broadcaster computing device 130 into various power-save modes according to Wi-Fi-specified procedures. In another example, the broadcaster computing device 130 comprises a Bluetooth controller, Bluetooth low energy ("BLE") controller, or an NFC controller capable of performing similar functions. An example Wi-Fi controller 136 communicates with the application 133 and is capable of sending and receiving data over a wireless, Wi-Fi communication channel. In another example, a Bluetooth controller, BLE controller, or NFC controller performs similar functions as the Wi-Fi controller 136 using Bluetooth, BLE, or NFC protocols. In an example, the Wi-Fi controller 136 activates the antenna 137 to create a wireless communication channel between the broadcaster computing device 130 and the receiver computing device 110. For example, the broadcaster computing device 130 communicates with the receiver computing device 110 via the antenna 137. In an example, when the broadcaster computing device 130 has been activated, the Wi-Fi controller 136 polls through the antenna 137 a radio signal, or listens for radio signals from the broadcaster computing device 130.

In an example, the antenna 137 is a means of communication between the broadcaster computing device 130 and the receiver computing device 110. In an example, a Wi-Fi controller 136 outputs through the antenna 137 a radio signal, or listens for radio signals from the receiver computing device 110. In another example a Bluetooth controller or a near field communication ("NFC") controller is used.

In an example, the speaker component 138 comprises a speaker device or other device capable of producing an ultrasound output. In an example, the speaker component 138 can communicate with the application 133 to receive an instruction to broadcast an ultrasound output. In an example, the speaker component 138 is a component of the broadcaster computing device 130. In another example, the speaker component 138 is communicatively coupled to the broadcaster computing device 130.

In an example, the microphone component 139 comprises a microphone device that is capable of receiving ultrasound inputs from an environment of the broadcaster computing device 130. In an example, the microphone component 139 communicates with the application 133 to receive an instruction to transition from a passive mode to an active mode and listen for ultrasound inputs. In an example, the microphone component 139 receives ultrasound inputs while in the active mode and transmits the received ultrasound inputs to the application 133.

In an example, receiver computing device 110 and the broadcaster computing device 130 communicate with the account management system 140 to do what send and/or receive data between the receiver computing device 110 and the broadcaster computing device 130 via the network 120. An example account management system 140, or service processing system, comprises an account management component 141, a data storage unit 145, and a transaction processing component 149.

In an example, the account management component 141 manages user 101 accounts and merchant system accounts associated with users 101 and merchant systems, respectively. In an example, the account management component 141 manages a user 101 account and a broadcaster account associated with users 101 and broadcaster computing device operators 102, respectively. The account management component 141 may receive requests to add, edit, delete, or otherwise modify payment account information for a user 101 account, merchant system account, broadcaster account or other appropriate account.

In an example, the data storage unit 145 comprises a local or remote data storage structure accessible to the account management system 140 suitable for storing information. In an example, the data storage unit 145 stores encrypted information, such as HTML5 local storage. In an example, the data storage unit 145 stores a service request identifier generated by the account management system 140 and service request details generated by the broadcaster computing device 130. In another example, the data storage unit 145 stores a service request identifier generated by the broadcaster computing device 130 and received from the broadcaster computing device 130.

In an example, the service processing component 149 receives service request details from a broadcaster computing device 130 and account information associated with a user 101 account. In another example, the service processing component 149 receives transaction details from the broadcaster computing device 130 and payment information associated with a user 101 payment account. In an example, the service processing component 149 transmits a payment authorization request to an issuer system through an acquirer system or other appropriate financial institution associated with the user 101 payment account information. An example payment authorization request may comprise merchant system payment account information, user 101 payment account information, and a total amount of the transaction. In an example, after the issuer system processes the payment authorization request, the transaction processing component receives an approval or denial of the payment authorization request from the issuer system over the network 120. In an example, the service processing component 149 transmits a receipt to the broadcaster computing device 130 and/or the receiver computing device 110 comprising a summary of the payment transaction. In other examples, the service processing component 149 processes a service request and transmits the receipt to the broadcaster computing device 130 and/or the receiver computing device 110 comprising a summary of the service request.

In another example, the service processing component 149 receives a service request identifier generated by the broadcaster computing device 130, a broadcaster computing device 130 identifier, and service request details from the broadcaster computing device 130. For example, the service request details comprise the total amount of a transaction. In an example, the service processing component 149 identifies a broadcaster system account, for example a merchant system account, based on the broadcaster computing device 130 identifier and identifies a payment account associated with the broadcaster system account for use in a transaction. In an example, the service processing component 149 associates the received service request details, service request identifier and payment account information and stores the associated service request details, service request identifier, and payment account information in a data storage unit 145 or other memory accessible by the account management system 140. In an example, the service processing component 149 receives the service request identifier from the receiver computing device 110. In this example, the service processing component 149 extracts the stored service request details and payment account information associated with the service request identifier. In an example, the service processing component 149 receives a user 101 payment account identifier based on a selection of the user 101 of the particular payment account via the user interface 111 of the receiver computing device 110. In this example, the service processing component 149 extracts the user 101 payment account information associated with the service request identifier.

Figure 8:
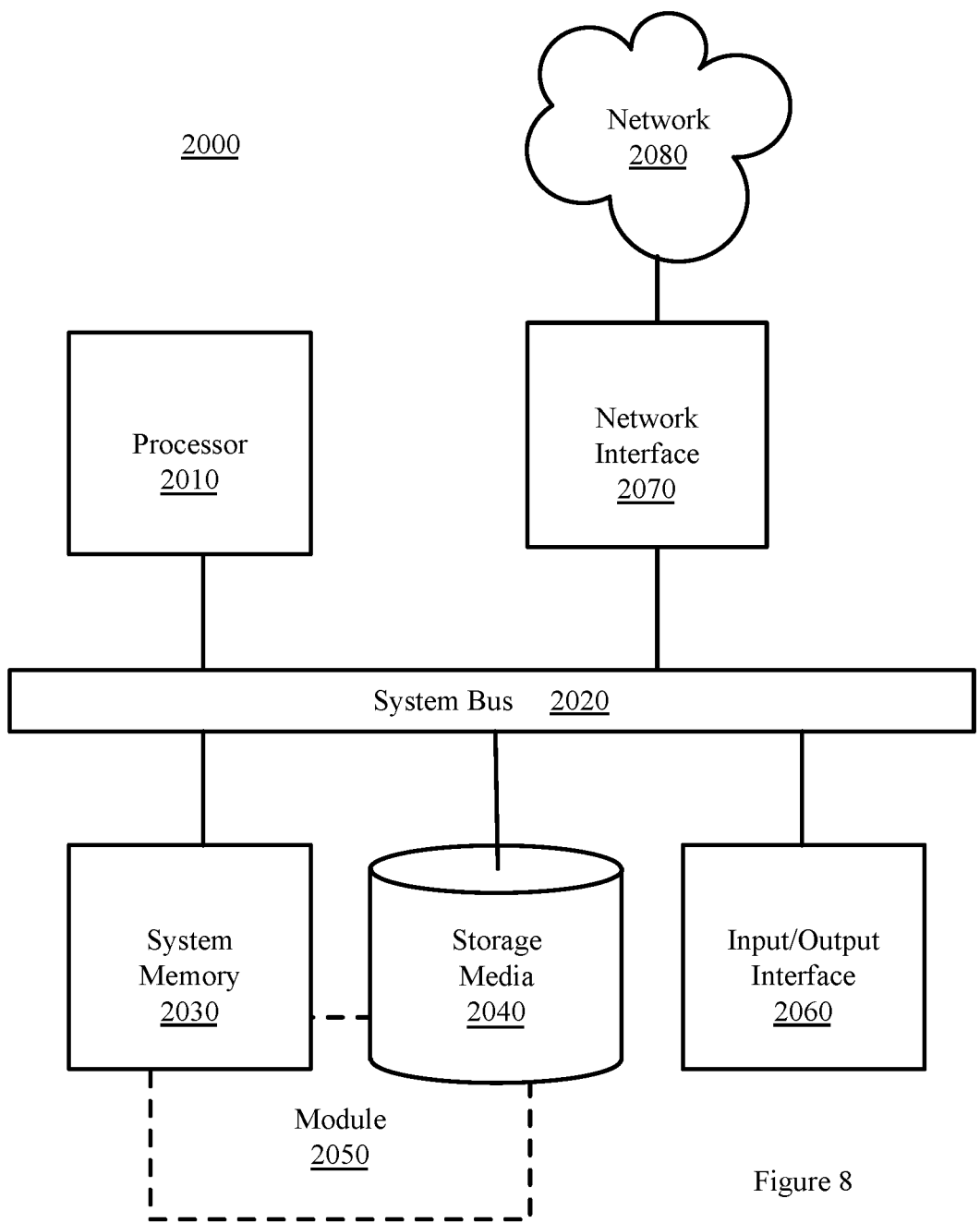
FIG. 8 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 8. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 8. The computing machines discussed herein may communicate with one another, as well as with other computing machines or communication systems over one or more networks, such as network 120. The network 120 may include any type of data or communications network, including any of the network technology discussed with respect to FIG. 8.

Example Processes

The example methods illustrated in FIGS. 2-5 are described hereinafter with respect to the components of the example operating environment 100. The example methods of FIGS. 2-5 may also be performed with other systems and in other environments. The operations described with respect to any of the FIGS. 2-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
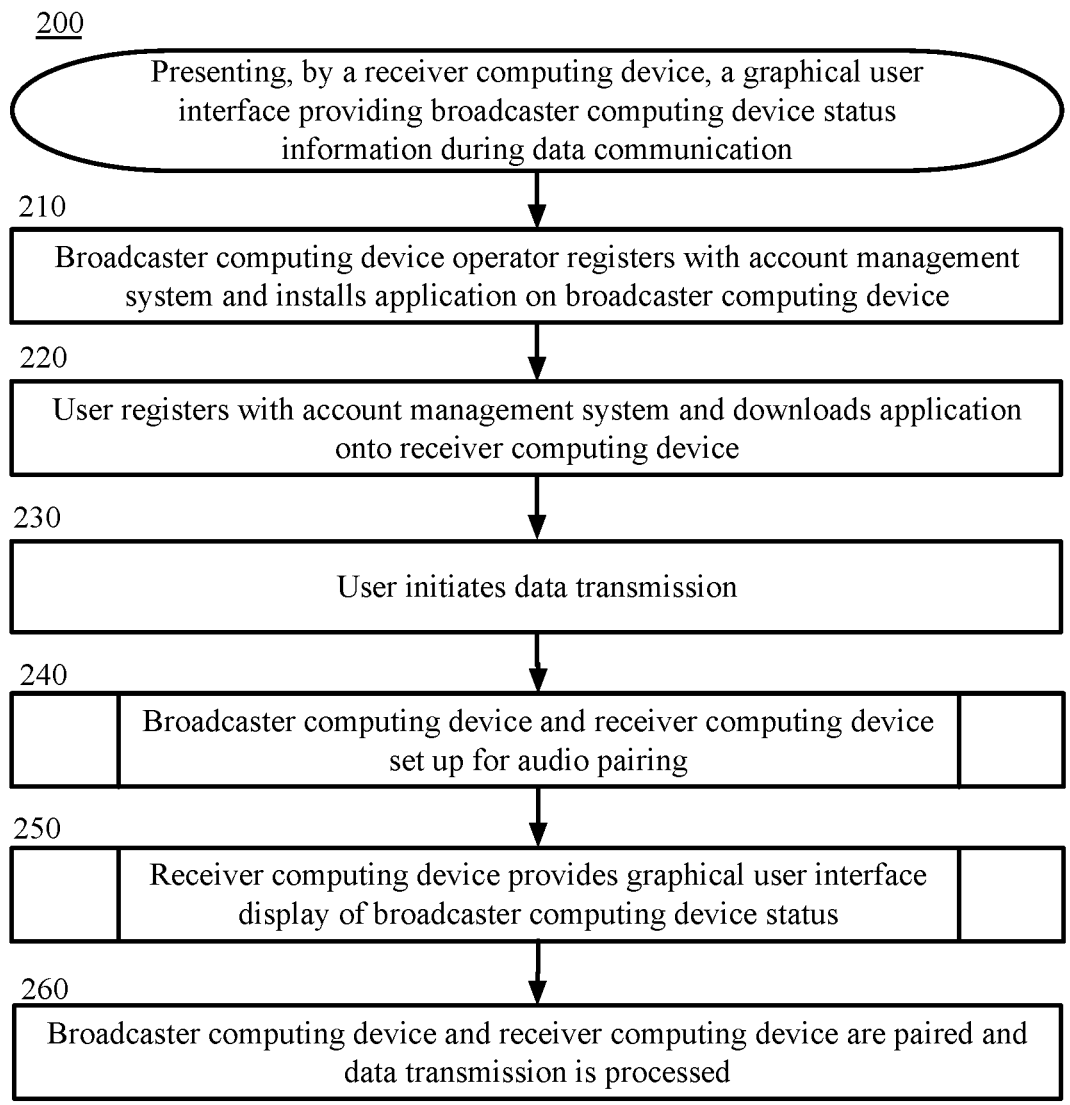
FIG. 2 is a block flow diagram depicting a method for presenting, by a receiver computing device, a graphical user interface providing broadcaster computing device status information during data communication, in accordance with certain examples.

FIG. 2 is a block diagram depicting a method 200 for presenting, by a receiver computing device 130, a graphical user interface 131 providing broadcaster computing device 110 status information during data communication, in accordance with certain examples. The method 200 is described with reference to the components illustrated in FIG. 1. In an example, during audio pairing with a broadcaster computing device 130, a receiver computing device 110 receives audio token data broadcast by the broadcaster computing device 130 via audio communication channels and displays a broadcaster computing device 130 status category to the user 101 via a graphical user interface 111 based on determining results of a CRC on the received audio token data or based on the value of a determined signal score as compared to low and high threshold signal scores received from an account management system 140.

In block 210, the broadcaster computing device operator 102 registers with an account management system 140. In an example, the broadcaster computing device operator 102 is an agent of a service system and registers for a merchant account with the account management system 140 via a web site of the account management system 140. An example service system comprises a merchant system. In another example, the agent of the service system may comprise a user other than the broadcaster computing device operator 102. In an example, a broadcaster computing device operator 102 installs the application 133 on the broadcaster computing device 130. In another example, the broadcaster computing device operator 102 purchases a broadcaster computing device 130 from the account management system 140 or otherwise obtains the broadcaster computing device 130 with the application 133 pre-installed on the broadcaster computing device 130. In an example, the broadcaster computing device 130 is able to communicate with one or more receiver computing devices 110 and the account management system 140 over a network 120. In an example, the broadcaster computing device 130 communicates with the account management system 140 via the application 133 over the network 120. In certain examples, the broadcaster computing device 130 may be able to transmit service request details and a broadcaster computing device 130 identifier to the account management system 140 via the application 133 over the network 120 to enable the account management system 140 to process a service request. In an example, the broadcaster computing device 130 is able to receive receipts from the account management system 140 that notifies a broadcaster computing device operator 102 as to whether a service request was successful or not. In an example, the broadcaster computing device 130 comprises a mobile computing device, for example, a mobile computing device, a tablet computing device, a wearable computing device, a laptop computing device, a point of sale terminal, or other computing device.

In block 220, the user 101 registers with the account management system 140. In an example, the user accesses an account management system 140 website via the receiver computing device 110. For example, the user 101 accesses the account management system 140 website via a web browser of the receiver computing device 110. In another example, the user 101 may otherwise contact the account management system 140 to register for a user 101 account. In an example, the user 101 registers with the account management system 140. The user 101 may obtain a user 101 account number, receive the appropriate applications and software to install on the receiver computing device 110 or perform any action provided by the account management system 140. The user 101 may utilize the functions of the receiver computing device 110, such as the user interface 111 and the web browser, to register and configure a user 101 account. In an example, the user 101 downloads an application 113 onto the receiver computing device 110. In an example, the application 113 operating on the receiver computing device 110 is able to communicate with the account management system 140 over the network 120. In an example, the user 101 enters account information into the user 101 account using the application 113. In an example, the user 101 may enter payment account information associated with one or more user 101 accounts, for example, one or more credit accounts, one or more bank accounts, one or more stored value accounts, and/or other appropriate accounts into the user 101 account maintained by the account management system 140. In an example, the user 101 configures permissions and settings associated with the user 101 account using the application 113. In an example, the user 101 may configure user 101 account settings or add, delete, or edit payment account information via the application 113. In an example, the user 101 may select an option to enable or disable the permission of the account management system 140 to process service requests.

In block 230, the user 101 initiates a data transmission. For example, the user 101, carrying the receiver computing device 110, arrives within a threshold distance of the broadcaster computing device 130. In an example, at a time prior to approaching the broadcaster computing device 130, the user 101 browses a location of the broadcaster computing device 130 and selects one or more items for which to conduct a service request. In this example, the user 101 may collect the one or more items and carry, or otherwise transport, the one or more items to the broadcaster computing device 130. In this example, the user 101 carries or otherwise has in his possession the receiver computing device 110. In an example, the broadcaster computing device operator 102 asks the user 101 to select a service request option. In an example, the broadcaster computing device 130 displays one or more service request options that the user 101 may select to use in a service request. Example service request options may comprise payment via an application 133 associated with the account management system 140 with which both the user 101 and the broadcaster computing system have an account, payment by cash, payment by check, payment by credit card, payment by debit card, and/or any other means of payment that the broadcaster computing system can or is willing to accept for payment from the user 101. In an example, the one or more service request options are displayed as objects on the user interface 131 and are selectable by the broadcaster computing device operator 102 in response to the user 101 directing the broadcaster computing device operator 102 to make a selection via the user interface 131 of the broadcaster computing device 130. In an example, the broadcaster computing device operator 102 may ask the user 101 if the user 101 wishes to conduct a service request using the account of the user 101 associated with the account management system 140. In an example, the user 101 indicates a desire to conduct the service request via the application 133. For example, the user 101 directs the broadcaster computing device operator 102 to initiate a service request by selecting the application 133.

In block 240, the broadcaster computing device 130 and the receiver computing device 110 are set up for audio pairing. Methods for setting up a broadcaster computing device 130 and a receiver computing device 110 for audio pairing are described in more detail hereinafter with reference to the method described in FIG. 3.

Figure 3:
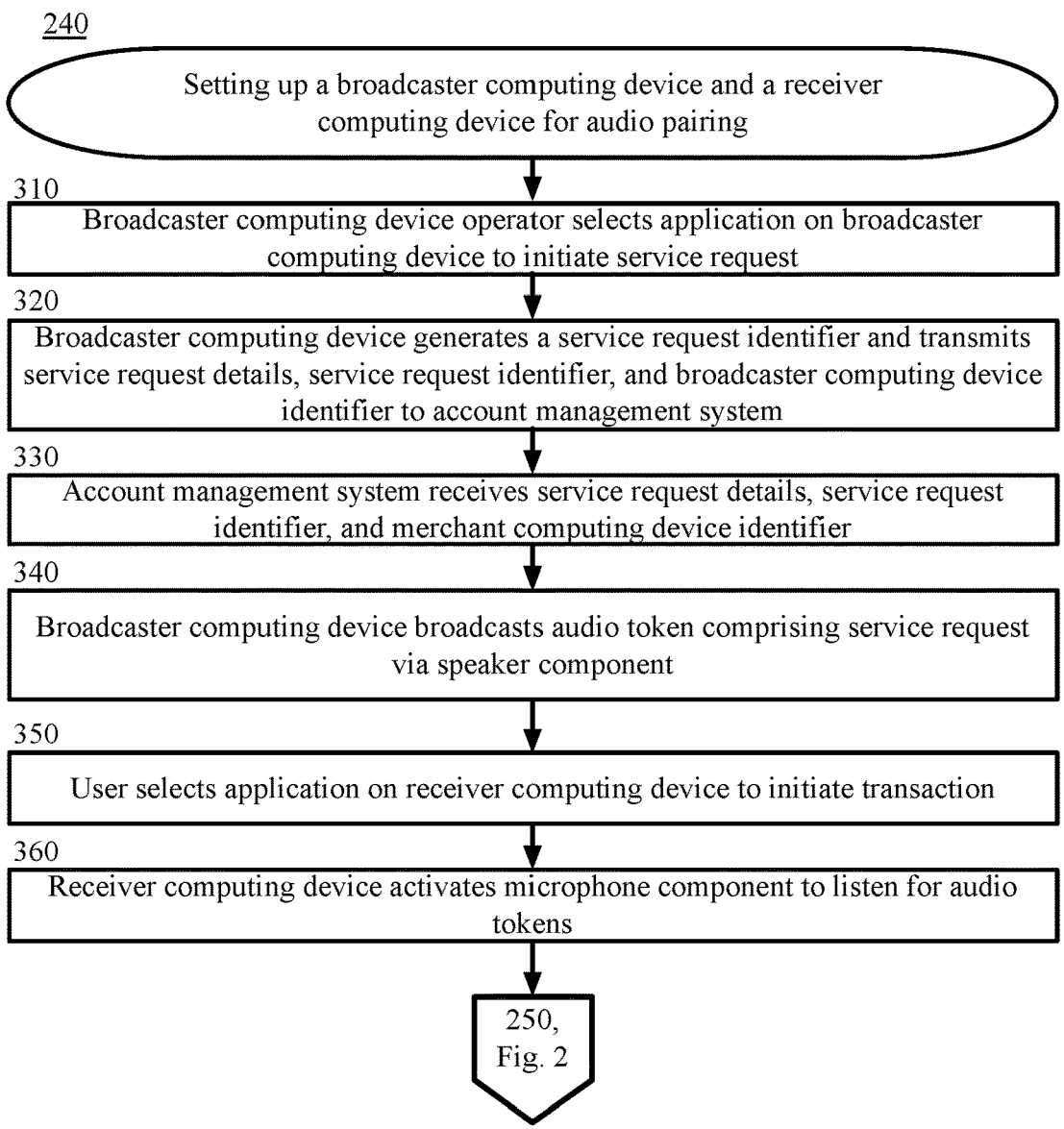
FIG. 3 is a block flow diagram depicting a method for setting up a broadcaster computing device and a receiver computing device for audio pairing, in accordance with certain examples.

FIG. 3 is a block diagram depicting a method 240 for setting up a broadcaster computing device 130 and a receiver computing device 110 for audio pairing, in accordance with certain examples. For example, audio pairing comprises an account management system 140 facilitating data communication between a broadcaster computing device 130 and a receiver computing device 110 over a network. To enable audio pairing, the account management system 140 associates a service request identifier with a broadcaster computing device 130, the broadcaster computing device 130 broadcasts an audio token comprising the service request identifier via an audio communication channel, the receiver computing device 110 receives the audio token via the audio communication channel, and the receiver computing device 110 transmits the service request identifier extracted from the audio token to the account management system 140 via the network 120. For example, a broadcaster computing device operator selects one or more user interface 131 objects on the broadcaster computing device 130 to cause the broadcaster computing device 130 to broadcast audio token data via a speaker component 138 and the user 101 selects one or more user interface 111 objects on the user computing device 110 to cause the user computing device 110 to activate a microphone component 119 to listen for the broadcast audio token data. The method 240 is described with reference to the components illustrated in FIG. 1.

In block 310, the broadcaster computing device operator 102 selects the application 133 on the broadcaster computing device 130 to initiate a service request. In an example, in response to receiving a verbal request from the user 101 to select the application 133 to process a service request, the broadcaster computing device operator 102 actuates an object on the user interface 131 of the broadcaster computing device 130 corresponding to the application 133. An example service request comprises a request to transmit data between the receiver computing device 110 and the broadcaster computing device 130.

In block 320, the broadcaster computing device 130 generates a service request identifier and transmits request details, a request identifier, and a broadcaster computing device 130 identifier to the account management system 140. In an example, the broadcaster computing device 130 generates the request identifier via a random number generator of the application 133. In an example, the request identifier comprises a string of alphanumeric and/or symbolic characters. In an example, service request details comprise a total amount for the request, a listing of the one or more items being purchased by the user 101, a listing of one or more data the user desires to transfer from the receiver computing device 110 to the broadcaster computing device 130 and/or receive from the broadcaster computing device 130 onto the receiver computing device 130, or other appropriate service request details that enable the account management system 140 to process the service request. In an example, the broadcaster computing device 130 identifier comprises a media access control ("MAC") address, hardware identifier, or other identifier associated with the broadcaster computing device 130. In this example, the account management system 140 is able to identify an account associated with the broadcaster computing device operator based on the broadcaster computing device 130 identifier. In an example, the broadcaster computing device 130 transmits the service request details, the service request identifier, and the broadcaster computing device 130 identifier to the account management system 140 via the network 120.

In another example, the broadcaster computing device 130 transmits a request for a service request identifier and transmits request details and a broadcaster computing device 130 identifier to the account management system 140 via the network 120. In an example, the account management system 140 receives the request for the service request identifier, the request details, and the broadcaster computing device 130 identifier via the network 120 and the account management system 140 broadcaster computing device 130 generates the request identifier via a random number generator of the account management system 140. In an example, the request identifier comprises a string of alphanumeric and/or symbolic characters. In an example, service request details comprise a total amount for the request, a listing of the one or more items being purchased by the user 101, a listing of one or more data the user desires to transfer from the receiver computing device 110 to the broadcaster computing device 130 and/or receive from the broadcaster computing device 130 onto the receiver computing device 130, or other appropriate service request details that enable the account management system 140 to process the service request. In an example, the broadcaster computing device 130 identifier comprises a media access control ("MAC") address, hardware identifier, or other identifier associated with the broadcaster computing device 130. In this example, the account management system 140 is able to identify an account associated with the broadcaster computing device operator based on the broadcaster computing device 130 identifier.

In block 330, the account management system 140 receives the service request details, the service request identifier, and the broadcaster computing device 130 identifier. For example, the account management system 140 receives the service request details, the service request identifier, and the broadcaster computing device 130 identifier via the network 120. For example, the service request identifier is a random number generated by the broadcaster computing device 130 and transmitted along with the broadcaster computing device 130 identifier and service request details comprising the total amount of the service request for the one or more items being purchased by the user 101. In an example, the account management system 140 identifies an account identifier associated with the broadcaster computing device operator based on the broadcaster computing device 130 identifier. For example, the account management system 140, at the time the broadcaster computing device operator creates an account with the account management system 140, associates the broadcaster computing device 130 identifier with an account identifier associated with the account and stores the association of the account identifier and the broadcaster computing device 130 identifier in a database or data storage unit 146 accessible to the account management system 140. In this example, upon receiving the broadcaster computing device 130 identifier, the service request details, and the service request identifier, the account management system 140 determines the broadcaster computing device operator's account identifier by accessing the database and extracting the account identifier associated with the broadcaster computing device 130 identifier. In an example, the account management system 140 stores the service request identifier, the broadcaster computing device operator's account identifier, and the service request details in a database or in the data storage unit 146 accessible to the account management system 140. In this example, the account management system 140 may associate the service request identifier with the account identifier and the service request details, for example, by storing the data in a table or other format.

In block 340, the broadcaster computing device 130 broadcasts an audio token comprising the service request identifier via a speaker component 138. In an example, in response to receiving an input of a selection of a user interface 133 object displayed by the application 133 and in response to generating the service request identifier and transmitting the service request identifier to the account management system 140, the broadcaster computing device 130 broadcasts the audio token comprising the service request identifier via audio communication channels. Broadcasting the audio token may comprise broadcasting the audio token via ultrasound communication, audible sound communication, or other sound communication. For example, as previously discussed, the broadcaster computing device 130 previously transmitted the service request identifier along with service request details to the account management system 140. In an example, the broadcaster computing device 130 broadcasts the audio token via ultrasound communication. The broadcaster computing device 130 may encrypt the audio token using a key shared with the account management system 140 and broadcast an encrypted audio token via audio communication channels.

In block 350, the user 101 selects the application 113 on the receiver computing device 110 to initiate the service request. In an example, the user 101 actuates one or more objects on the user interface 111 of the receiver computing device 110 corresponding to the application 113 to initiate a service request.

In block 360, the receiver computing device 110 activates a microphone component 119. In an example, in response to receiving the selection of the application 113 on the receiver computing device 110 or in response to selection of an interface object in the application 113 via the user interface 111, the receiver computing device 110 instructs the microphone component 119 to listen for audio signals in an environment of the receiver computing device 110.

From block 360, the method 240 proceeds to block 250 in FIG. 2.

Returning to FIG. 2, in block 250, the receiver computing device 110 provides a graphical user interface display of a broadcaster computing device 130 status. Methods for providing, by a receiver computing device 110, a graphical user interface display of a broadcaster computing device 130 status are described in more detail hereinafter with reference to the method described in FIG. 4.

Figure 4:
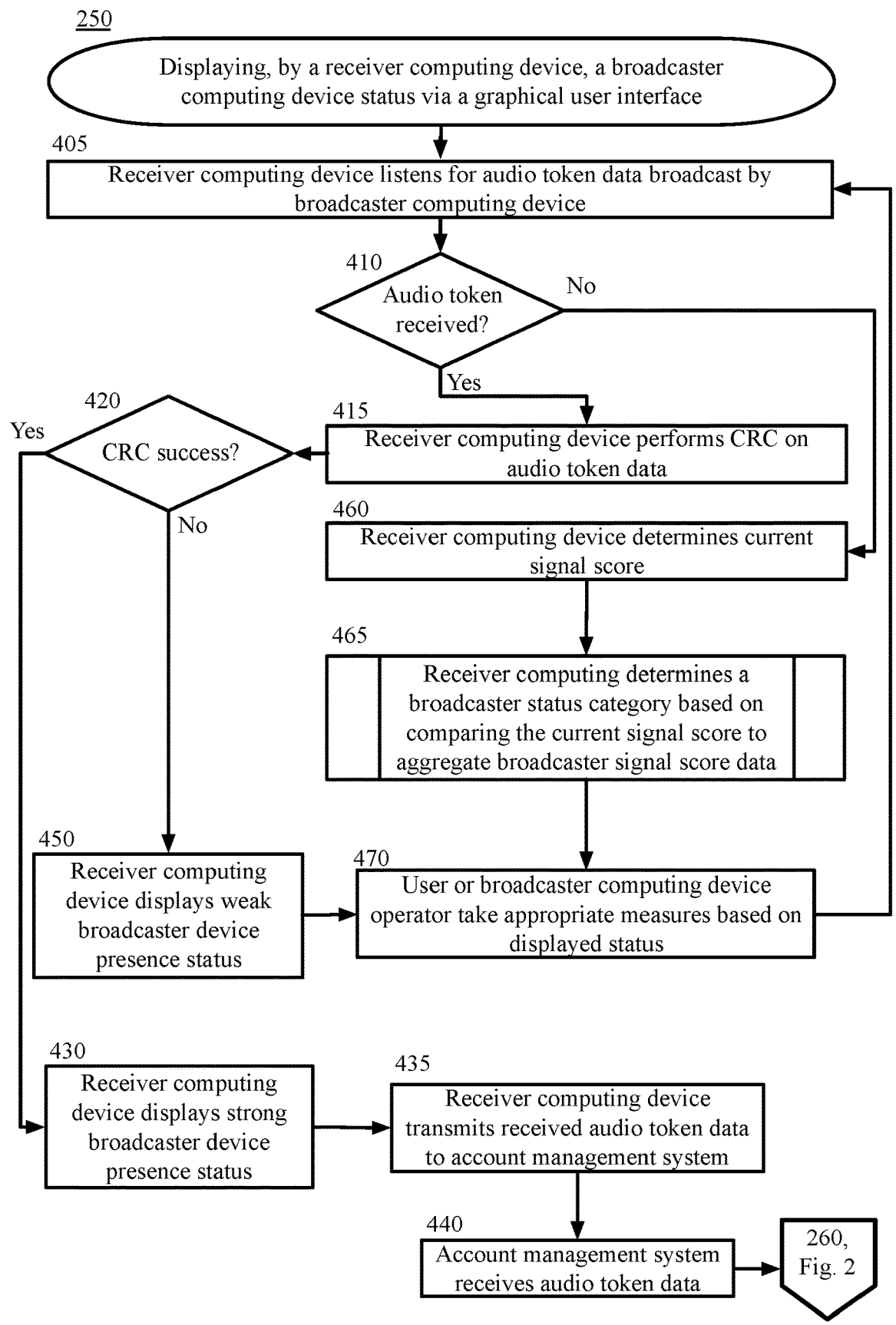
FIG. 4 is a block flow diagram depicting a method for displaying, by a receiver computing device, a broadcaster computing device status via a graphical user interface, in accordance with certain examples.

FIG. 4 is a block diagram depicting a method 250 for providing, by a receiver computing device 110, a graphical user interface display of a broadcaster computing device 130 status, in accordance with certain examples. In some examples, the receiver computing device 110 receives audio tokens broadcast by the broadcaster computing device 130 and displays, via the graphical user interface 111, either a strong broadcaster computing device 130 presence status or a weak broadcaster computing device 130 presence status based on the results of performing a CRC on a received audio token. In this example, if the receiver computing device 110 performs a CRC on at least one of the received multiple successive audio tokens and determines no errors from the CRC, the receiver computing device 110 displays a strong broadcaster computing device 130 presence status. However, the receiver computing device 110, in response to determining that there are one or more errors in the received audio token resulting from the CRC performed on a received audio token, displays a weak broadcaster computing device 130 presence status via the graphical user interface 111. In other examples, the receiver computing device 110 does not receive any audio tokens broadcast by the broadcaster computing device 130 and the receiver computing device 110 displays, via the graphical user interface 111, a broadcaster device probably present status, a broadcaster device probably absent status, or a broadcaster device absent status based on a determined signal score of received audio token data. In certain examples, the receiver computing device 110, in response to not receiving an audio token, determines a current broadcaster computing device 130 signal score, and determines a broadcaster computing device 130 status based on the position of the current broadcaster computing device 130 signal score with respect to audio token present and audio token absent signal score thresholds determined by the account management system. The method 250 is described with reference to the components illustrated in FIG. 1.

In block 405, the receiver computing device 110 listens for audio token data broadcast by the broadcaster computing device 130. For example, in response to receiving the selection of the application 113 on the receiver computing device 110 or in response to selection of an interface object in the application 113 via the user interface 111, the receiver computing device 110 logs a timestamp at the time the receiver computing device 110 and activates the microphone component 119 and instructs the microphone component 119 to listen for audio tokens until a predefined threshold length of time passes from the time indicated on the timestamp. In an example, after the threshold length of time passes, the receiver computing device 110 deactivates the microphone component 119 or otherwise instructs the microphone component 119 to cease listening for audio tokens broadcast by the broadcaster computing device 130.

In block 410, the receiver computing device 110 either receives or does not receive a valid audio token. In some examples, the receiver computing device 110 receives an audio token and is able to decode the audio token and extract a valid service request identifier and proceed with communicating with the account management system 140 to complete a service request or data transmission. However, in other examples, the receiver computing device 110 receives no sound input or either receives an audio token and is unable to extract a valid service request identifier to proceed with the service request or data transmission. For example, the audio token is not valid if it does not pass a CRC and an invalid audio token may comprise a service request identifier that is unintelligible to the receiver computing device 110 after decoding.

If the receiver computing device receives a valid audio token, the method 250 proceeds to 415. In this example, the receiver computing device receives a valid audio token that the receiver computing device 110 will be able to decode and extract a service request identifier to communicate to the account management system 140. In certain examples, the receiver computing device 110 computes a signal score for the received audio token comprising a measured energy value of the received audio token, logs a time stamp, and transmits the determined signal score and time stamp to the account management system 140 via the network 120.

In block 415, the receiver computing device performs a CRC on the received audio token data. In an example, performing a CRC comprises comparing a sum of a first region comprising a series of characters to a sum of a second region of the audio token comprising a series of characters. In an example, the first and second regions are located in specific locations of audio tokens and comprise regions identifiable by the receiver computing device 110. In an example, each character in the first region and the second region comprises an alphanumeric and/or symbolic character and each character corresponds to a standard value known by the receiver computing device 110. For example, the characters are associated with hexadecimal values. In an example, the audio token data comprises a six character region comprising a service request identifier and a two character region for performing a CRC.

In block 420, the receiver computing device determines whether the CRC was successful. In an example, the receiver computing device 110 determines a value for each character in the first region and a value for each character in the second region and calculates a first sum of the values of the characters in the first region of the audio token data and a second sum of the values of the characters in the second region of the audio token data. If the first sum and the second are equal, the CRC is successful. However, if the first sum is not equal to the second sum, the CRC is unsuccessful. A successful CRC provides an indication that the received audio token data is clear, valid, and/or uncorrupt.

If the CRC is successful, the method 250 proceeds to block 430. For example, the first six characters correspond to hexadecimal values 1, 4, A, C, 9, 2, and the CRC characters correspond to a value of hexadecimal number 26, (where A=10 and B=12 in decimal valuation). In this example, the CRC is successful because the sum of the first six characters is 26 in hexadecimal and corresponds with the CRC characters value of 26.

In block 430, the receiver computing device 110 displays a strong broadcaster computing device 130 presence status. For example, in response to determining that the CRC is successful for the received audio token, the receiver computing device 110, the receiver computing device 110 displays, via a graphical user interface 111, a strong broadcaster computing device 130 status. In other examples, the receiver computing device 110 must receive a threshold number of audio tokens and perform a successful CRC on each received audio token before displaying the strong broadcaster computing device 130 presence status. For example, the threshold number of audio tokens for which a successful CRC is required to display the strong broadcaster computing device 130 presence status. comprises two audio tokens, three audio tokens, four audio tokens, or another predetermined number of audio tokens. In this example, if the receiver computing device 130 does not perform successful CRCs on a threshold number of received audio tokens, the receiver computing device 110 displays a weak broadcaster computing device 130 presence status, as described herein in a later step.

In an example, to display the strong broadcaster computing device 130 presence status, the receiver computing device 110 indicates, via one or more outputs of the user interface 111, that the receiver computing device 110 is successfully receiving audio token data broadcast by the broadcaster computing device 130. Example outputs comprise a text display, a graphical display, an image display, a video display, or other appropriate display via the graphical user interface 111 of the receiver computing device 110. Further example outputs comprise an audible sound output generated by the receiver computing device 110, a video output, a vibration, a vibration pattern comprising multiple vibrations of equal or varying length, or other appropriate outputs of the receiver computing device 110. For example, the graphical user interface 111 may comprise a display of a green background color on the user interface 111, a vibration, and a message that reads "broadcaster present— audio pairing successful." In an example, the one or more outputs uniquely indicate a broadcaster computing device 130 present status to the user 101 and comprise a different one or more outputs for other broadcaster computing device 130 statuses that a receiver computing device 110 is able to indicate during an attempted audio pairing. In an example, the receiver computing device 110 transmits received audio token data to the account management system 140 via the network 120. For example, the receiver computing device 110 decodes a received audio token, extracts a service request identifier from the audio token, and transmits the service request identifier to the account management system 140 via the network 120. In an example, the user 101 may configure the receiver computing device 110 not to display a strong broadcaster computing device 130 presence status even when the receiver computing device 110 receives the audio token data and performs a successful CRC on the audio token data. For example, the user 101 may not desire to be alerted during a successful audio pairing.

In block 435, the receiver computing device 110 transmits the received audio token data to the account management system. In an example, the receiver computing device 110 decodes the received audio token data, extracts the service request identifier, and transmits the service request identifier to the account management system 140. For example, the application 113 transmits the service request identifier to the account management system 140 via the network 120. In an example, the application 113 also transmits a user 101 account identifier for an account associated with the user 101 maintained by the account management system 140 or transmits a receiver computing device 110 identifier associated with the receiver computing device 110. In this example, the user 101 account is associated with the receiver computing device 110 identifier.

In block 440, the account management system 140 receives the audio token data. For example, the account management system 140 receives, via the network 120, the audio token data. For example, the account management system 140 receives the service request identifier via the network 120 from the receiver computing device 110. In an example, the account management system 140 identifies the broadcaster computing device 130 based on the service request identifier received from the receiver computing device 110. For example, the account management system 140 receives the service request identifier from the broadcaster computing device 130 when the audio token is configured and then later receives the service request identifier from the receiver computing device 110 after the broadcaster computing device transmits the audio token data to the receiver computing device 110. Based on the service request identifier received from both the broadcaster computing device 130 and the receiver computing device 110, the account management system 140 pairs the broadcaster computing device 130 and the receiver computing device 110 over the network 120 so that the broadcaster computing device 130 and the receiver computing device 110 may communicate via the network 120 and/or with the account management system 140 via the network 120. In an example, the receiver computing device 110 communicates, via the network 120 to the account management system 140, the received service request identifier along with data to transmit to the broadcaster computing device 140. The account management system 140 identifies the broadcaster computing device 130 based on the service request identifier and transmits the data received from the receiver computing device 110 to the broadcaster computing device 130 via the network 120.

From block 440, the method 250 proceeds to block 260 in FIG. 2. In an example, the broadcaster computing device 130 and the receiver computing device 110 may send and/or receive data via the account management system 140 over the network 120 after the account management system 140 pairs the two devices. In another example, the receiver computing device 110 does not establish a network 120 connection with the broadcaster computing device 130 device and the receiver computing device 110 communicates the service request identifier to the account management system 140 and the account management system 140 communicates with the receiver computing device 110 via the network 120 to process a service request using data associated with the service request identifier previously transmitted by the broadcaster computing device 130 to the account management system 140.

Returning to block 420, in FIG. 4, if the CRC was not successful, the method 250 proceeds to block 450. For example, a first region of the received, decoded audio token data and a second region of the received decoded audio token data and performs a CRC on the first region using the second region. For example, a first region comprising six characters of the received, decoded audio token data comprises 1, 4, A, C, 9, 2, and a second region comprising two CRC characters comprises 23. In this example, the CRC is not successful because the sum of the first six characters is 26 in hexadecimal and does not correspond with the CRC value of 23. In an example, receiving audio token data but failing a CRC on the received audio token data indicates that the receiver computing device 110 is receiving a weak audio signal and that moving closer to the broadcaster computing device 130 would result in a stronger received audio signal. In an example, the receiver computing device 110 does not extract the service request identifier from the received audio token data if the CRC is not successful. In another example, the receiver computing device 110 extracts the region comprising the service request identifier and transmits the extracted region to the account management system 140 via the network 120. In examples, the receiver computing device 110 continues to listen for subsequent audio token data via the microphone component 119 until a threshold amount of time passes from a time at which the receiver computing device 110 received an input via the user interface 111 instructing the receiver computing device 110 to conduct a service request or transmission of data via audio pairing.

In block 450, the receiver computing device 110 displays a weak broadcaster computing device 110 presence status. For example, the receiver computing device 110, in response to determining that there a CRC of the received audio token is unsuccessful, displays a weak broadcaster computing device 130 presence status via the graphical user interface 111 of the receiver computing device 110. For example, the receiver computing device 110 indicates, via one or more outputs via the user interface 111, that the receiver computing device 110 is receiving data from the broadcaster computing device 130, but that the receiver computing device 110 is not receiving a transmission of the audio token data of a sufficient quality or clarity to complete an audio pairing of the devices. For example, the audio token data is received with one or more errors due to unclarity or low quality of the audio token data audio transmission. For example, the audio token data may be unclear, unintelligible, or partly intelligible to the receiver computing device 110 after reception and decoding by the receiver computing device 110 because of environmental sound interference or because of distance. In an example, the one or more outputs may comprise a text display, a graphical display, an image display, a video display, or other appropriate display via the graphical user interface 111 of the receiver computing device 110. The one or more outputs of the receiver computing device 110 may further comprise an audible sound output, a video output, a vibration, a vibration pattern comprising multiple vibrations of equal or varying length, or other appropriate outputs of the receiver computing device 110. For example, the graphical user interface 111 comprises a display of a yellow or orange background color, a vibration, and a message that reads "broadcaster device signal weak; move closer to broadcaster device." In an example, the one or more outputs uniquely indicate the weak broadcaster computing device 130 presence status to the user 101 and are different from the one or more outputs for other broadcaster computing device 130 presence statuses that a receiver computing device 110 may indicate during an attempted audio pairing.

In block 470, the user 101 or broadcaster computing device 130 operator 102 take appropriate measures based on the displayed status. In an example, the user 101 associated with the receiver computing device 110 or the broadcaster computing device operator 102 take appropriate action in response to viewing the weak broadcaster computing device 130 presence status displayed on the user interface 111 of the receiver computing device 110. For example, the user 101 moves the receiver computing device 110 to within a closer distance of the broadcaster computing device 130. In another example, the broadcaster computing device operator 102 moves the broadcaster computing device 130 closer to the receiver computing device 110.

From block 470, the method 250 returns to block 405, and the receiver computing device 110 listens for audio token data broadcast by the broadcaster computing device 130. In an example data transmission or service request, the receiver computing device 110 listens for audio token data for a threshold length of time and receives multiple audio tokens in the same threshold length of time. In an example, the receiver computing device 110 continues to listen for audio token data broadcast by the broadcaster computing device 130 and, since the receiver computing device 110 was moved to within a closer proximity to the broadcaster computing device 130, the receiver computing device 110 receives one or more subsequent audio tokens broadcast by the broadcaster computing device 130 from a closer distance. In an example, the receiver computing device 110 performs a CRC on a particular subsequent audio token of the received one or more subsequent audio tokens, determines no errors in the CRC, and transmits the received particular audio token to the account management system 140 via the network 120. For example, the receiver computing device 110 decodes the received particular subsequent audio token, extracts a service request identifier from the received particular subsequent audio token, and transmits the subsequent service request identifier to the account management system 140 via the network 120.

Returning to block 410, if the receiver computing device does not detect an audio token, the method 250 proceeds to block 460. In an example, the receiver computing device 110 receives an audio token and is unable to extract a valid service request identifier to proceed with the service request or data transmission. For example, the audio token is not valid if it does not pass a CRC and an invalid audio token may comprise a service request identifier that is unintelligible to the receiver computing device 110 after decoding. In other examples, the receiver computing device 110 does not receive an audio token broadcast by the broadcaster computing device 130.

In block 460, the receiver computing device 110 determines a current broadcaster signal score. In an example, while the receiver computing device 110 is listening for audio token data, each time the receiver computing device 110 receives an audio input, the receiver computing device 110 computes a signal score for the received input comprising a measured energy value of the received audio token. In certain examples, determining a signal score for received audio token data from a broadcaster computing device comprises measuring, by the broadcaster computing device, an energy value for received audio token data after applying a series of decoding processes to audio token data. In an example, the broadcaster computing device 130, before broadcasting the audio token via an audio communication channel, encrypts the audio token data, applies a pedestal offset to the audio token data, and applies a direct sequence spread spectrum modulation technique to the encrypted offset audio token data to broadcast modulated encrypted offset audio token data via audio communication. An example direct sequence spread spectrum modulation technique comprises multiplying the audio token data by a pseudo noise digital signal and applying a radio frequency carrier. For example, the radio frequency carrier shifts modulated encrypted offset audio token data up to a certain frequency, for example, 18.5 kHz. When the receiver computing device 110 receives the broadcast modulated encrypted offset audio token data via the microphone component 119, the receiver computing device 110 performs a despreading operation on the received audio token to determine the encrypted offset audio token data. An example despreading operation reverses the direct sequence spread spectrum modulation technique applied before the token was broadcast and removes the pseudo noise digital signal and radio frequency carrier. An example direct sequence spread spectrum modulation technique comprises removing the pseudo noise digital signal multiplier from the audio token data and removing the radio frequency carrier. The receiver computing device 110 finds an offset in the audio token to associated with the pedestal and removes the offset to determine the encrypted audio token data, and decrypts the encrypted audio token data using a key to determine the audio token data. In an example, the receiver computing device 110 corrects the audio token data to account for phase shift. In an example, after performing the despreading operation, removing the offset, decrypting the audio token, and correcting the audio token to account for phase shift, the receiver computing device 110 calculates a signal score of the received audio token comprising a measured energy value of the received audio token.

In another example, determining, by the receiver computing device 110, a signal score comprises determining a ratio of characters in the decoded audio token that are intelligible to the receiver computing device 110. In an example, the receiver computing device 110 decodes all or part of the processed audio token data. In certain examples, broadcaster computing device reads the decoded audio token data and determines the signal score based on the intelligibility of all or part of the decoded audio token data. For example, a region of an audio token comprises six characters and the receiver computing device 110 successfully decoded and understands four of six characters of the region of the processed audio token data and determines a signal score of 4/6=(0.67) for the initial audio receiver configuration. In certain examples, a signal score comprises a value between zero and one. In an example, the receiver computing device 110 otherwise determines a signal score based on the received processed audio token data indicating a quality of the transmission of audio token data as received at the receiver computing device 110.

In an example, in addition to determining a signal score, the receiver computing device 110 logs a time stamp corresponding to a time at which the signal score was determined and transmits the signal score and associated time stamp to the account management system 140 via the network 120. In this example, the receiver computing device 110 also logs a time stamp at which the receiver computing device 110 receives and decodes each audio token data and transmits the time stamp to the account management system 140 via the network 120.

In block 465, the receiver computing device 110 determines an appropriate status to display via the graphical user interface 111 of the receiver computing device 110 based on the determined signal score of the data received at the receiver computing device 110 compared against aggregate receiver computing device 110 signal score data for audio pairings. Methods for determining, by a receiver computing device 110, an appropriate status to display via the graphical user interface 111 of the receiver computing device 110 based on the determined signal score of the data received at the receiver computing device 110 compared against aggregate receiver computing device 110 signal score data for audio pairings are described in more detail hereinafter with reference to the method described in FIG. 5.

Figure 5:
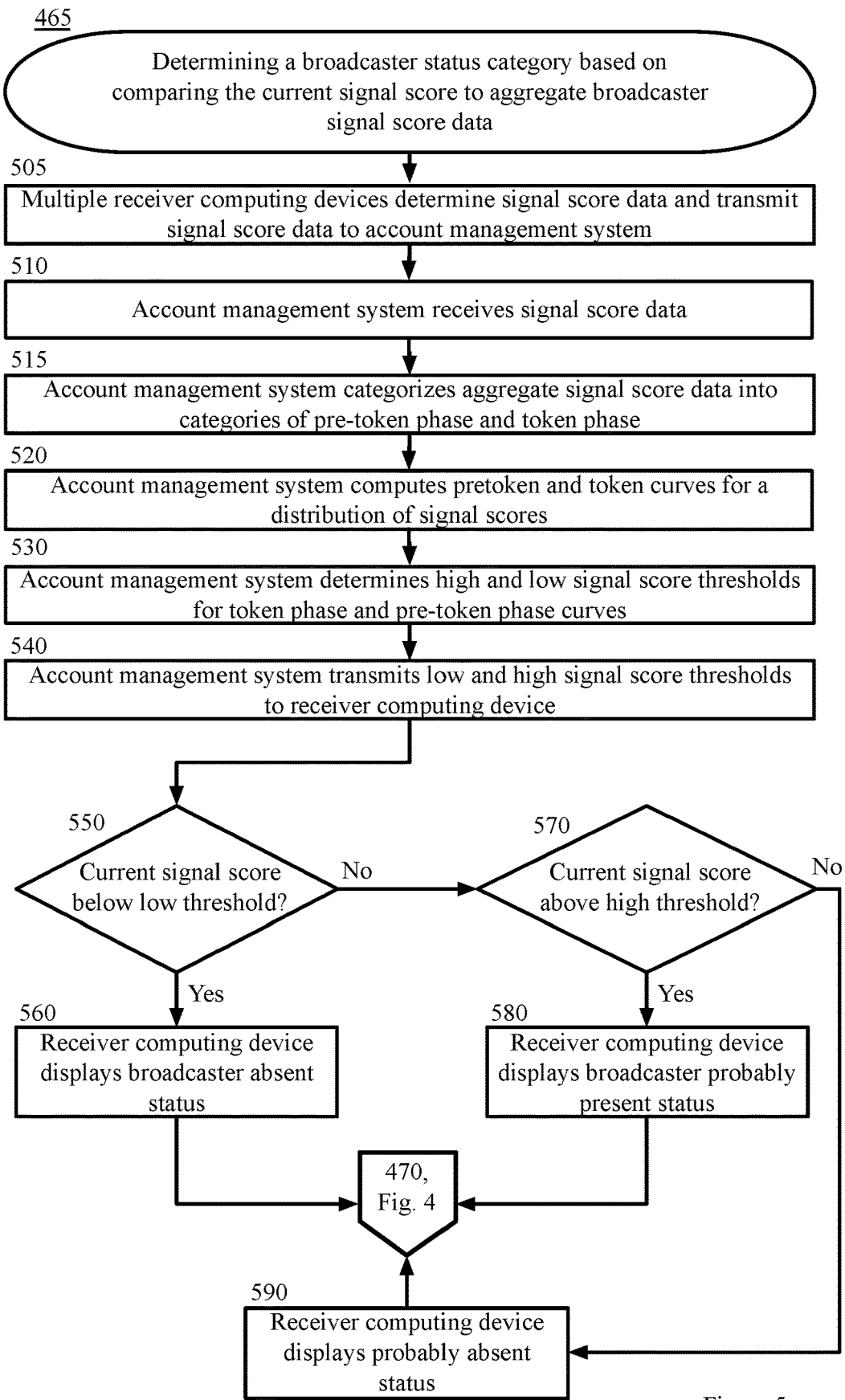
FIG. 5 is a block flow diagram depicting a method for determining a broadcaster status category based on comparing the current signal score to aggregate broadcaster signal score data, in accordance with certain examples.

FIG. 5 is a block diagram depicting a method 465 for determining, by a receiver computing device 110, an appropriate status to display via the graphical user interface 111 of the receiver computing device 110 based on the determined signal score of the data received at the receiver computing device 110 compared against aggregate receiver computing device 110 signal score data for audio pairings, in accordance with certain examples. The method 250 is described with reference to the components illustrated in FIG. 1. In certain examples, the receiver computing device 110 determines a graphical user interface 111 display based on comparing the current signal score of the audio token data received from the broadcaster computing device 130 against signal score thresholds computed by an account management system from a distribution of aggregate signal score data received from multiple receiver computing devices 110 for past audio pairings.

In block 505, multiple receiver computing devices 110 determine signal score data and transmit the signal score data to the account management system 140. In an example, the account management system 140 receives, via the network 120 from each of multiple receiver computing devices 110, one or more signal scores determined during audio pairings with one or more broadcaster computing devices 130. In an example, the signal score data comprises time stamp data indicating a time that each signal score was determined. Further, the account management system 140 receives, from each of the multiple receiver computing devices via the network 120.

In block 510, the account management system 140 receives the signal score data. For example, the account management system 140 receives the signal score data from each of the multiple receiver computing devices 110. In an example, the account management system 140 determines a model identifier for each receiver computing device 110 from which the account management system 140 receives signal score data and associates each received signal score with the respective model identifier and the time stamp logged by the receiver computing device 110 at the time the receiver computing device 110 determined the respective signal score. In an example, the account management system 140 stores the received signal score data, each received signal score associated with a respective time stamp and a respective model identifier. In this example, if the account management system 140 receives an audio token or a service request identifier extracted from the audio token in an audio pairing associated with any received signal score, the account management system 140 stores the received signal score associated with a respective first time stamp logged by the receiver computing device 110 when the signal score was determined, a second time stamp logged by the account management system 140 when the audio token or service request identifier was received, and the model identifier. In certain examples, the second time stamp is logged by the receiver computing device 110 when the receiver computing device 110 transmits the audio token or service request identifier extracted from the audio token to the account management system 140 via the network 120. In yet another example, the second time stamp is logged by the receiver computing device 110 when the receiver computing device 110 conducts a successful CRC on the received audio token data, when the receiver computing device 110 extracts the service request identifier, or at another appropriate time that indicates that a valid audio token was received by the receiver computing device 110.

In block 515, the account management system 140 categorizes the aggregate signal score data into categories of pre-token and token phase. In an example, each of the multiple receiver computing devices 110 from which the account management system receives signal scores computes one or more signal scores for audio inputs received during both pre-token and token phases of audio pairings with broadcaster computing devices 130. For example, a pre-token phase of an audio pairing between a receiver computing device 110 and a broadcaster computing device 130 comprises a period of time in which the receiver computing device 110 is listening for audio token data but the broadcaster computing device 130 has not yet broadcast any audio token data or the broadcaster computing device 130 is broadcasting audio token data but not within an audio communication proximity such that the receiver computing device 110 can receive the audio token data broadcast by the broadcaster computing device. In an example, the token phase of an audio pairing between the receiver computing device 110 and the broadcaster computing device 130 comprises a period of time in which the receiver computing device 110 is listening for audio token data and the broadcaster computing device 130 is broadcasting audio token data within the audio communication proximity such that the receiver computing device 110 can receive audio token data broadcast by broadcaster computing device 130.

In an example, the account management system 140 categorizes each signal score as pre-token phase or token phase based on time stamps associated with each signal score. In an example, signal scores have two associated time stamps, a first time stamp indicating when the signal score was determined by the receiver computing device 110 and a second time stamp indicating when the audio token or service request identifier was received by the receiver computing device 110. In this example, if the first time stamp chronologically precedes the second time stamp, the account management system 140 classifies the signal score as a pre-token phase signal score. In this example, if the second time stamp chronologically precedes the first time stamp, the account management system 140 classifies the signal score as a token phase signal score. In another example, certain signal scores have only the first time stamp indicating when the signal score was determined by the receiver computing device 110 and do not have a second time stamp indicating when the valid audio token or service request identifier was received by the receiver computing device 110 because no valid audio token or service request identifier was received by the receiver computing device 110 during an attempted audio pairing. In this example, the signal score is classified as a pre-token phase signal score because a valid audio token was never received after the respective signal score was determined by the receiver computing device. In certain examples, the account management system 140 disregards and does not store received signal score data for audio pairings in which there is only a first time stamp.

In block 520, the account management system 140 computes pre-token phase and token phase curves for a distribution of signal scores. As previously discussed, for each signal score received from each of multiple receiver computing devices 110, the account management system 140 classifies the respective received signal score as either a pre-token phase signal score or a token phase signal score. In an example, the account management system, for each model identifier, plots a first distribution of pre-token phase signal scores and a second distribution of token phase signal scores. In an example, the account management system 140 determines a pre-token phase curve to best fit the first distribution of pre-token phase signal scores associated with the model identifier and determines a token phase curve to best fit the second distribution of token phase signal scores for the model identifier. In another example, the account management system 140 determines a pre-token phase curve by interpolating between the values in the first distribution of pre-token phase signal scores to infer probabilities at pre-token phase signal score values that are missing from the distribution associated with the model identifier and determines a token phase curve by interpolating between the values in the second distribution of token phase signal scores to infer probabilities at token phase signal score values that are missing from the distribution for the model identifier. In an example computation of a pre-token phase curve and a token phase curve, the pre-token phase curve overlaps with the token phase curve in a coordinate plane in which the x-axis comprises a range of signal score values and the y-axis comprises a number of signal scores in the distribution of signal scores or either a percentage of signal scores.

In block 530, the account management system 140 determines high and low signal score thresholds for the token and pre-token curves. In an example, the account management system 140 determines, based on the computed pre-token phase curve for a signal score distribution associated with a particular model identifier, an audio token absent probability for a particular signal score comprising a probability that an audio token is not received by the receiver computing device. The audio token absent probability comprises an area under the pre-token phase curve between the particular signal score and a signal score value equal to a highest token phase signal score from the signal score distribution for the model identifier. In an example, the account management system 140 determines, based on the computed token phase curve for the signal score distribution associated with a particular model identifier, an audio token present probability for a particular signal score comprising a probability that an audio token is received by the receiver computing device 110. The audio token present probability comprises an area under the token phase curve between a signal score value equal to a lowest token phase signal score from the signal score distribution for the model identifier and the particular signal score. Accordingly, for any particular signal score, the account management system 140 may compute a token present probability based on the token phase curve and a token absent probability based on the pre-token phase curve.

In an example, the account management system 140 determines a high signal score threshold. For example, the high threshold comprises an audio token present threshold signal score such that signal scores above the audio token present threshold signal score are deemed to indicate a status that a broadcaster computing device 130 is probably present. In this example, the higher the high threshold is set, the more certain the receiver computing device 110 can be that the broadcaster computing device 130 is probably present. However, the higher the high threshold is set, the more likely that, in some cases, the receiver computing device 110 determines a broadcaster computing device 130 probably absent status when the more appropriate status would be the broadcaster computing device 130 probably present status. On the other hand, the lower the high threshold is set, the less certain the receiver computing device 110 can be that the broadcaster computing device 130 is probably present but the less likely it is that the receiver computing device 110 wrongly determines a broadcaster computing device 130 absent status. In an example, the account management system 140 determines a high threshold signal score that comprises a signal score along the token phase probability curve at which the audio token present probability is equal to a predetermined probability, for example, 0.7, 0.75, 0.8, 0.9, or other predetermined probability. The determined high threshold is unique to the receiver computing device 110 model and may be different from a high threshold determined for a different receiver computing device 110 model. Further, in examples, the account management system 140 continuously or periodically receives subsequent signal score data from the multiple receiver computing devices 110 and continues to store the received subsequent signal score data, associated model identifiers, and associated first and/or second timestamps indicating times at which the signal score was logged and at which a valid audio token was received for the respectively audio pairing. Accordingly, as new subsequent signal score data is received for the receiver computing device 110 model, the model-specific signal score distribution may change over time, resulting in a changing high threshold as the account management system 140 periodically re-computes the token phase curve and re-determines the high signal score threshold as appropriate for the model identifier.

In an example, the account management system 140 determines a low signal score threshold. For example, the low threshold comprises an audio token absent threshold signal score such that signal scores below the audio token absent threshold signal score are deemed to indicate a status that a broadcaster computing device 130 is absent. In this example, the lower the high threshold is set, the more certain the receiver computing device 110 can be that the broadcaster computing device 130 is absent. However, the lower the low threshold is set, the more likely that, in some cases, the receiver computing device 110 determines a broadcaster computing device 130 absent status when the more appropriate status would be the broadcaster computing device 130 is probably absent. On the other hand, the higher the low threshold is set, the less certain the receiver computing device 110 can be that the broadcaster computing device 130 is absent but the less likely it is that the receiver computing device 110 wrongly determine a broadcaster computing device 130 absent status. In an example, the account management system 140 determines a low threshold signal score that comprises a signal score along the token phase probability curve at which the audio token absence probability is equal to a predetermined probability, for example, 0.7, 0.75, 0.8, 0.9, or other predetermined probability. The determined low threshold is unique to the receiver computing device 110 model and may be different from a low threshold determined for a different receiver computing device 110 model. Further, in examples, the account management system 140 continuously or periodically receives subsequent signal score data from the multiple receiver computing devices 110 and continues to store the received subsequent signal score data, associated model identifiers, and associated first and/or second timestamps indicating times at which the signal score was logged and at which a valid audio token was received for the respectively audio pairing. Accordingly, as new subsequent signal score data is received for the receiver computing device 110 model, the model-specific signal score distribution may change over time, resulting in a changing low threshold as the account management system 140 periodically re-computes the pre-token phase curve and re-determines the low signal score threshold as appropriate for the model identifier.

In block 540, the account management system 140, transmits the determined low and high signal score thresholds for pre-token and token curves to the receiver computing device 110. For example, the account management system transmits the determined low and high thresholds for pre-token and token curves to the receiver computing device 110 via the network 120. In an example, the account management system determines low and high signal score thresholds for a particular receiver computing device 110 model and transmits the determined low and high thresholds to each receiver computing device 110 of the receiver computing device 110 model via the network 120. As previously discussed, the account management system 140 continuously or periodically receives signal score data from multiple receiver computing devices 110 of a receiver computing device 110 model, the account management system 140 re-calculates, as appropriate, the low and high signal score thresholds for the receiver computing device 110 model and transmits the subsequently determined low and high thresholds to the receiver computing device 110 via the network 120. In other examples, the receiver computing device 110 transmits a request, via the network 120 to the account management system 140, a request for low and high threshold signal scores for the receiver computing device 110 model, the account management system 140 determines the low and high threshold signal scores as described herein for the receiver computing device 110 model, and the account management system 140 transmits the determined low and high threshold signal scores to the receiver computing device 110 via the network 120 in response to the request for the low and high threshold signal scores.

In certain examples, instead of both a low threshold and a high threshold, the account management system 140 determines either a low threshold or a high threshold and transmits the determined threshold to the receiver computing device 110 via the network 120. For example, the account management system 140 determines the high signal score threshold only. For example, the high threshold comprises an audio token present threshold signal score such that signal scores above the audio token present threshold signal score are deemed to indicate a status that a broadcaster computing device 130 is probably present. In another example, the account management system 140 determines the low signal score threshold only. For example, the low threshold comprises an audio token absent threshold signal score such that signal scores below the audio token absent threshold signal score are deemed to indicate a status that a broadcaster computing device 130 is absent.

In block 550, the receiver computing device 110 determines whether the current signal score is below the low threshold. For example, the receiver computing device 110 receives the low and high threshold signal scores associated with the receiver computing device 110 model from the account management system 140 via the network 120. As previously discussed, the receiver computing device 110 determined a current signal score for the broadcaster computing device 130 for the received audio token data. In certain examples, the receiver computing device 110 does not receive the low threshold and only receives the high threshold and therefore does not determine whether the signal score is below the low threshold.

If the current signal score is below the low threshold signal score, the method 465 proceeds to block 560. For example, the receiver computing device 110 compares the current signal score for the broadcaster computing device 130 against the low threshold signal score for the receiver computing device 110 model and determines that the current signal score is less than the low threshold signal score.

Figure 6:
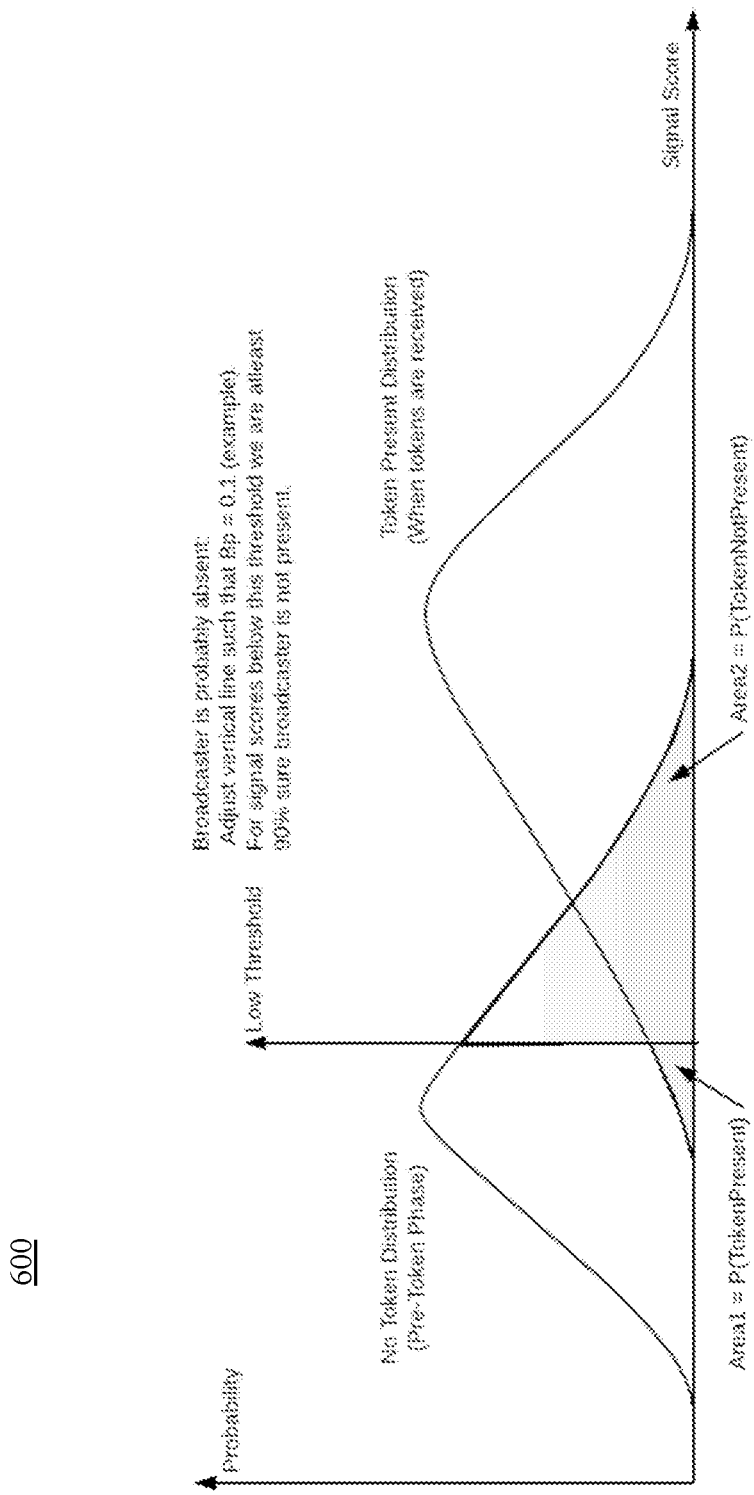
FIG. 6 is an example illustration 600 of pre-token phase and token phase curves for an example broadcaster computing device 130 absent status, in accordance with certain examples.

FIG. 6 is an example illustration 600 of pre-token phase and token phase curves for an example broadcaster computing device 130 absent status, in accordance with certain examples. FIG. 6 illustrates a determined low threshold indicating a token not present probability in the shaded area to the right of the low threshold under the pre-token phase curve, and, conversely, a token present probability in the shaded area to the left of the low threshold under the token phase distribution curve. In an example, the token not present probability at the low threshold signal score comprises 0.90 and the token present probability comprises 0.10. An example broadcaster absence threshold formula ("Ba") comprises: Ba=Area1/(Area1+Area2). In another example, the example broadcaster absence threshold formula ("Ba") comprises: Ba=Area1/(Area2). In these examples, the sum of Area1 and Area2 need not equal unity. In illustration 600, assuming Area1=0.2 and Area2=0.8, the low threshold is equal to 0.20, which is 0.2 divided by the sum of 0.2 and 0.8. In this example illustrated in FIG. 6, the determined broadcaster absence threshold represents a 75% confidence of broadcaster computing device 130 being absent. For example, a broadcaster absence probability signifies a probability that the broadcaster computing device 130 is not broadcasting audio token data and a broadcaster presence probability signifies a probability that the broadcaster computing device 130 is broadcasting the audio token data. In an example, the account management system 140 sets the low threshold to be located at 10% probability of broadcaster present (1 in 10 predictions will be wrong) and sets the high threshold to be located at 80% broadcaster presence probability (1 in 5 prediction will be wrong). In this example, for each receiver computing device 110 model, the account management system 140 adjusts the broadcaster presence threshold such that ratio of Area1/(Area1+Area2) equals 0.1 and 0.8.

Returning to FIG. 5, in block 560, the receiver computing device 110 displays a broadcaster computing device 130 absent status. In an example, the receiver computing device 110 indicates, via one or more outputs via the graphical user interface 111, that the broadcaster computing device 130 has not initiated for audio pairing and therefore is not currently broadcasting audio token data for audio pairing. Example outputs comprise a text display, a graphical display, an image display, a video display, or other appropriate display via the graphical user interface 111 of the receiver computing device 110. The outputs may further comprise an audible sound output, a video output, a vibration, a vibration pattern comprising multiple vibrations of equal or varying length, or other appropriate outputs of the receiver computing device 110. For example, the graphical user interface 111 may display a red background color, a vibration, and a message that reads 'broadcaster device absent, request that broadcaster device operator initiate audio pairing." In an example, the one or more outputs uniquely indicate a broadcaster computing device 130 absence status to the user 101 and are different from one or more outputs for other broadcaster computing device 130 statuses that the receiver computing device 110 is able to indicate during an attempted audio pairing.

From block 560, the method 465 proceeds to block 470 in FIG. 4. For example, in block 470 of FIG. 4, the user 101 or broadcaster computing device operator 102 take appropriate measures based on the displayed status. For example, the user 101 or broadcaster computing device operator 102 take appropriate remedial measures based on the displayed broadcaster computing device 130 absence status. For example, the user 101 requests that the broadcaster computing device 130 operator select one or more user interface 131 objects on the broadcaster computing device 130 to initiate a service request or otherwise initiate audio pairing with the receiver computing device 110. In an example, in response to viewing the broadcaster computing device 130 absence status displayed on the graphical user interface 111 of the receiver computing device 110 or being otherwise alerted by the user 101, the broadcaster computing device 130 operator 102 selects one or more objects on the user interface 131 of the broadcaster computing device 130 to initiate audio pairing. In an example, in response to receiving the selection of the one or more user interface 131 objects, the broadcaster computing device 130 begins broadcasting audio token data via audio communication channels. Due to the remedial measures taken by the broadcaster computing device operator 102 to configure the broadcaster computing device 130 for audio pairing, the receiver computing device 110 may receive an audio token broadcast by the broadcaster computing device 130 via the audio communication channels.

Returning to block 550, if the receiver computing device 110 determines that the current signal score is not below the low threshold, the method 465 proceeds to block 570. In an example, the receiver computing device 110 compares the current signal score for the broadcaster computing device 130 against the low threshold signal score for the receiver computing device 110 model and determines that the current signal score is greater than the low threshold signal score.

In block 570, the receiver computing device 110 determines whether the current signal score is above the high threshold. In an example, the receiver computing device 110 compares the current signal score for the broadcaster computing device 130 against the high threshold signal score for the receiver computing device 110 model and determines whether the current signal score is higher than the high threshold signal score.

If the current signal score is above the high threshold, the method 465 proceeds to block 580. In an example, the receiver computing device 110 compares the current signal score for the broadcaster computing device 130 against the high threshold signal score for the receiver computing device 110 model and determines that the current signal score is higher than the high threshold signal score.

Figure 7:
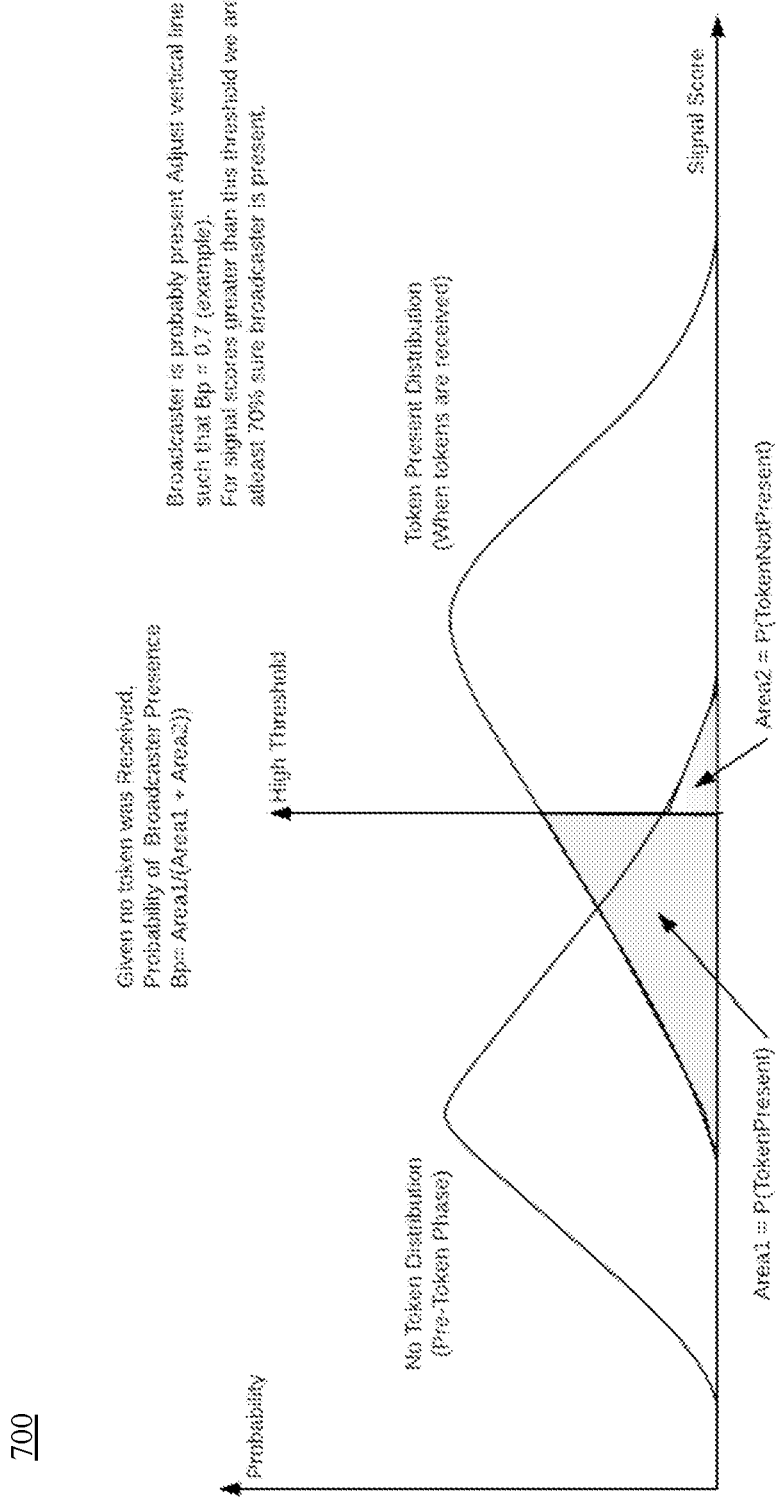
FIG. 7 is an example illustration 700 of pre-token phase and token phase curves for an example broadcaster computing device 130 probably present status, in accordance with certain examples.

FIG. 7 is an example illustration 700 of pre-token phase and token phase curves for an example broadcaster computing device 130 probably present status, in accordance with certain examples. FIG. 7 illustrates a determined high threshold indicating a token probably present probability in the shaded area to the left of the high threshold under the token phase curve, and, conversely, a token not present probability in the shaded area to the right of the low threshold under the pre-token phase curve. In an example, the token present probability at the high threshold signal score comprises 0.70 and the token not present probability comprises 0.30. In an example, if no valid audio token is received by the receiver computing device 110 when the signal score is determined, the probability of the broadcaster computing device 130 being present is equal to the token present probability divided by the sum of the token present and token absent probabilities. In another example, if no valid audio token is received by the receiver computing device 110 when the signal score is determined, the probability of the broadcaster computing device 130 being present is equal to the token present probability divided by the token absent probability. In illustration 700, assuming Area1=0.4 and Area2=0.3, the high threshold is equal to 0.66, which is 0.4 divided by 0.6. In this example illustrated in FIG. 7, the determined broadcaster present threshold represents a 66% confidence of broadcaster computing device 130 being present. For example, broadcaster presence probability signifies a probability that the broadcaster computing device 130 is broadcasting the audio token data. In these examples, the sum of Area1 and Area2 need not equal unity.

Returning to FIG. 5, in block 580, the receiver computing device 110 displays a broadcaster computing device 130 probably present status. In an example, the receiver computing device 110 indicates, via one or more outputs via the graphical user interface 111, that the receiver computing device 110 is receiving data from the broadcaster computing device 130, however, the receiver computing device 110 is not receiving a transmission of the audio token data of a sufficient quality to complete an audio pairing of the receiver computing device 110 with the broadcaster computing device 130. Example outputs comprise a text display, a graphical display, an image display, a video display, or other appropriate display via the graphical user interface 111 of the receiver computing device 110. The outputs may further comprise an audible sound output, a video output, a vibration, a vibration pattern comprising multiple vibrations of equal or varying length, or other appropriate outputs of the receiver computing device 110. For example, the graphical user interface 111 may display a yellow background color, a vibration, and a message that reads 'broadcaster device probably present, move closer to broadcaster device." In an example, the one or more outputs uniquely indicate a broadcaster computing device 130 probably present status to the user 101 and are different from one or more outputs for other broadcaster computing device 130 statuses that the receiver computing device 110 is able to indicate during an attempted audio pairing.

In certain examples, instead of displaying one of three possible statuses comprising broadcaster absent, broadcaster probably absent, and broadcaster probably present based on the comparing the current signal score against two received threshold signal score values, the receiver computing device 110 determines a status based on comparing the current signal score against a single threshold, for example either the low threshold or the high threshold received from the account management system 140. In an example, the high threshold comprises an audio token present threshold signal score such that signal scores above the audio token present threshold signal score are deemed to indicate a status that a broadcaster computing device 130 is probably present. In certain examples, if the current signal score is higher than the high threshold, the receiver computing device 110 determines a broadcaster present status and if the current signal score is equal to or less than the high threshold, the receiver computing device 110 determines a broadcaster absent status and displays the broadcaster absent status via the user interface 111. In another example, the low threshold comprises an audio token absent threshold signal score such that signal scores below the audio token absent threshold signal score are deemed to indicate a status that a broadcaster computing device 130 is absent. In certain examples, if the current signal score is lower than the low threshold, the receiver computing device 110 determines a broadcaster absent status and if the current signal score is equal to or greater than the low threshold, the receiver computing device 110 determines a broadcaster present status and displays the broadcaster present status via the user interface 111.

From block 480, the method 465 proceeds to block 470 in FIG. 4. For example, in block 470 of FIG. 4, the user 101 or broadcaster computing device operator 102 take appropriate measures based on the displayed status. For example, the user 101 or broadcaster computing device operator 102 take appropriate remedial measures based on the displayed broadcaster computing device 130 probably present status. For example, the user 101 moves the receiver computing device 110 closer to the broadcaster computing device 130 so that the receiver computing device 110 receives a higher quality transmission of the audio token data being broadcast by the broadcaster computing device 130. In an example, in response to viewing the broadcaster computing device 130 probably present status displayed on the graphical user interface 111 of the receiver computing device 110 or being otherwise alerted by the user 101, the broadcaster computing device 130 operator 102 moves the broadcaster computing device 130 closer to the receiver computing device 110. In an example, the broadcaster computing device 130 continues to transmit the audio token data via audio communication channels. Due to the remedial measures taken by the user 101 and/or the broadcaster computing device operator 102 to reposition the receiver computing device 110 and/or the broadcaster computing device 130 closer to each other, the receiver computing device 110 may receive the valid audio token data broadcast by the broadcaster computing device 130 via the audio communication channels, extract a service request identifier, and transmit the service request identifier to the account management system 140 via the network 120.

Returning to block 570, if the receiver computing device 110 determines that the current signal score is not above the high threshold, the method 465 proceeds to block 590. For example, the receiver computing device 110 determines that the current signal score is neither below the low threshold nor above the high threshold. For example, the receiver computing device 110 determines that the current signal score is somewhere between the low threshold and the high threshold.

In block 590, the receiver computing device 110 displays a broadcaster computing device 130 probably absent status. In an example, the receiver computing device 110 indicates, via one or more outputs via the graphical user interface 111, that either the broadcaster computing device 130 has not initiated for audio pairing and therefore is not currently broadcasting audio token data for audio pairing and/or that the receiver computing device 110 is not receiving a transmission of the audio token data of a sufficient quality to complete an audio pairing of the receiver computing device 110 with the broadcaster computing device 130. Example outputs comprise a text display, a graphical display, an image display, a video display, or other appropriate display via the graphical user interface 111 of the receiver computing device 110. The outputs may further comprise an audible sound output, a video output, a vibration, a vibration pattern comprising multiple vibrations of equal or varying length, or other appropriate outputs of the receiver computing device 110. For example, the graphical user interface 111 may display a red background color, a vibration, and a message that reads 'broadcaster device probably absent, request that broadcaster device operator verify that audio pairing is initiated and move closer to broadcaster device." In an example, the one or more outputs uniquely indicate a broadcaster computing device 130 probably absent status to the user 101 and are different from one or more outputs for other broadcaster computing device 130 statuses that the receiver computing device 110 is able to indicate during an attempted audio pairing.

From block 590, the method 465 proceeds to block 470 in FIG. 4.

Returning to FIG. 4, in block 470, the user 101 or broadcaster computing device 130 operator 102 take appropriate measures based on the displayed status. For example, the user 101 or broadcaster computing device operator 102 take appropriate remedial measures based on the displayed broadcaster computing device 130 probably absent status. For example, the user 101 requests that the broadcaster computing device 130 operator select one or more user interface 131 objects on the broadcaster computing device 130 to initiate a service request or otherwise initiate audio pairing with the receiver computing device 110. In an example, in response to viewing the broadcaster computing device 130 probably absent status displayed on the graphical user interface 111 of the receiver computing device 110 or being otherwise alerted by the user 101, the broadcaster computing device 130 operator 102 selects one or more objects on the user interface 131 of the broadcaster computing device 130 to initiate audio pairing. In an example, in response to receiving the selection of the one or more user interface 131 objects, the broadcaster computing device 130 begins broadcasting audio token data via audio communication channels. Due to the remedial measures taken by the broadcaster computing device operator 102 to configure the broadcaster computing device 130 for audio pairing, the receiver computing device 110 may receive an audio token broadcast by the broadcaster computing device 130 via the audio communication channels. In another example, as a remedial measure after viewing the displayed broadcaster computing device 130 probably absent status, the user 101 moves the receiver computing device 110 closer to the broadcaster computing device 130 so that the receiver computing device 110 receives a higher quality transmission of the audio token data being broadcast by the broadcaster computing device 130. In an example, in response to viewing the broadcaster computing device 130 probably absent status displayed on the graphical user interface 111 of the receiver computing device 110 or being otherwise alerted by the user 101, the broadcaster computing device 130 operator 102 moves the broadcaster computing device 130 closer to the receiver computing device 110. In an example, the broadcaster computing device 130 continues to transmit the audio token data via audio communication channels. Due to the remedial measures taken by the user 101 and/or the broadcaster computing device operator 102 to reposition the receiver computing device 110 and/or the broadcaster computing device 130 closer to each other, the receiver computing device 110 may receive the valid audio token data broadcast by the broadcaster computing device 130 via the audio communication channels, extract a service request identifier, and transmit the service request identifier to the account management system 140 via the network 120.

From block 470, the method 250 proceeds to block 405, and the receiver computing device 110 listens for audio tokens broadcast by the broadcaster computing device 130. In an example, due to the remedial measures taken by the broadcaster computing device operator 102 to configure the broadcaster computing device 130 for audio pairing, the receiver computing device 110 may receive an audio token broadcast by the broadcaster computing device 130 via the audio communication channels. In another example, due to the remedial measures taken by the user 101 and/or the broadcaster computing device operator 102 to reposition the receiver computing device 110 and/or the broadcaster computing device 130 closer to each other, the receiver computing device 110 may receive the valid audio token data broadcast by the broadcaster computing device 130 via the audio communication channels, extract a service request identifier, and transmit the service request identifier to the account management system 140 via the network 120. For the subsequent audio token, the receiver computing device 110 determines a broadcaster computing device 130 status to display via the graphical user interface 111 of the receiver computing device 110 as described in example method 250.

The receiver computing device may display other broadcaster computing device 130 status information via the graphical user interface other than or in addition to the examples described herein comprising a strong broadcaster device presence status, a weak broadcaster device presence status, a broadcaster device probably present status, a broadcaster device probably absent status, a broadcaster device absent status, and other applicable broadcaster device status indicating a state of a broadcaster computing device. For example, the receiver computing device 110 may display information concerning a Wi-Fi signal strength, a Bluetooth signal strength, a Bluetooth Low Energy ("BLE") signal strength, or other signal strength of the broadcaster computing device 130. In certain examples, the receiver computing device 110 also displays receiver computing device 110 status information. For example, the receiver computing device 110 displays, via the graphical user interface 111, in response to the user 101 selecting an interface object to initiate a service request or a data transfer, an interface object indicating that the microphone component 119 of the receiver computing device is listening for audio communications.

Returning to FIG. 2, in block 260, the broadcaster computing device 130 and the receiver computing device 110 are paired and the service request is processed. In an example, as previously discussed, the receiver computing device 110 receives the audio token comprising the service request identifier broadcast by the broadcaster computing device 130. For example, the microphone component 119 receives the audio token broadcast by the broadcaster computing device 130 via ultrasound communication or audible sound communication and transmits the received audio token to the application 113 of the receiver computing device 110. In an example, the application 113 extracts the service request identifier from the received audio token. In certain examples, in response to receiving an input via the user interface 111, the receiver computing device 110 opens or otherwise activates the application 113 on the receiver computing device 110. In this example, the application 113 displays a request to approve a service request. An example request to approve a service request comprises service request details received via the token broadcast from the broadcaster computing device 130. In an example, the request to approve the service request may comprise one or more objects on the user interface 111 that a user 101 may select to indicate approval or denial of the request to approve the service request. In an example, the user 101 selects, via the user interface 111, a user interface 111 object to indicate approval of the request to approve the service request and the receiver computing device 110 receives the indication of the user 101 approval of the service request. In another example, the user 101 selects, via the user interface 111, a user interface 111 object to indicate denial of the request to approve the service request and the receiver computing device 110 receives an input of an indication of the user 101 denial of the service request.

In an example, the receiver computing device 110 communicates the service request identifier to the account management system 140. For example, the application 113 transmits the service request identifier to the account management system 140 via the network 120. In an example, the application 113 also transmits a user 101 account identifier for an account associated with the user 101 account maintained by the account management system 140 or transmits a receiver computing device 110 identifier associated with the receiver computing device 110. In this example, the user 101 account is associated with the receiver computing device 110 identifier. In an example, the account management system 140 communicates with the receiver computing device 110 and processes a service request. In an example, the account management system 140 identifies the user 101 account based on the received receiver computing device 110 identifier or the received user 101 account identifier. In an example, the account management system 140 identifies service request details and a broadcaster computing device operator's account based on the received service request identifier. In an example, the account management system 140 extracts the broadcaster computing device operator account identifier and the service request details associated with the service request identifier from a database or in the data storage unit 146 accessible to the account management system 140.

In an example, the account management system 140 generates a service authorization request and transmits, via the network 120, the service authorization request to an issuer system associated with the account selected by the user 101 or the account preconfigured for use in service requests by the user 101. In an example, the service authorization request includes the total amount of the service request associated with the service request identifier, the broadcaster computing device operator's 102 account identifier associated with the service request identifier, and a user 101 account identifier associated with the user 101 account selected by the user 101 or preconfigured for use by the user 101 in transactions. In an example, the issuer system receives the service authorization request via the network 120 and either approves or denies the service authorization request. In an example, the issuer system approves the service authorization request and transmits a notice of approval of the service authorization request or a notice of denial of the service authorization request to the account management system 140 in accordance with approving or denying the service authorization request. In an example, the account management system 140 receives a notice of approval of the service authorization request from the issuer system and transmits a receipt, via the network 120, to the receiver computing device 110 and/or the broadcaster computing device 130 indicating that the service request was successfully completed and comprising the service request details and information associated with the one or more accounts used in the service request. In another example, the account management system 140 receives a notice of denial of the service authorization request from the issuer system and transmits a receipt, via the network 120, to the user computing device and/or to the broadcaster computing device 130 indicating that the service authorization request was denied. In an example, the receiver computing device 110 receives, via the network 120, the receipt information indicating a service authorization request approval or a service authorization request denial and displays all or part of the receipt information via the user interface 111 of the user computing device. In an example, the broadcaster computing device 130 receives, via the network 120, the receipt information indicating a service authorization request approval or a service authorization request denial and displays all or part of the receipt information via the user interface 131 of the broadcaster computing device 130.

In an example, account management system 140 establishes a network 120 connection between the broadcaster computing device 130 and the receiver computing device 110 based on the identifying both the broadcaster computing device 130 and the receiver computing device 110 associated with the service request identifier. In an example, the broadcaster computing device 130 transmits a request for data to the receiver computing device 110. For example, the broadcaster computing device 130 transmits the request for data to the receiver computing device 110 via the network 120 communication channel established between the devices by the account management system 140. In this example, the receiver computing device 110 receives the request for data via the network 120 communication channel. In an example, the broadcaster computing device 130 transmits data to the receiver computing device 110 comprising images, text, files, or other data selected by the broadcaster computing device operator. In this example, in response to establishing a network connection between the receiver computing device 110, the broadcaster computing device 130 displays a request to select data for transmission to the receiver computing device 110. For example, the broadcaster computing device 130 may display a menu of user interface 131 objects associated with one or more images, files, text, or other data selectable by the operator of the broadcaster computing device 130 that enable the operator to indicate one or more data items the operator wishes to transmit to the receiver computing device 110. In this example, the broadcaster computing device 130 operator selects one or more of the user interface 131 objects and the broadcaster computing device 130 receives an indication of the selection of the one or more user interface 131 objects indicating one or more corresponding data items the operator wishes to transmit to the receiver computing device 110. In another example, the receiver computing device 110 receives, from the broadcaster computing device 130, one or more data items selected by the user 101 for transmission by the broadcaster computing device 130 to the receiver computing device 110. For example, the one or more data items comprise one or more of images, documents, files, text, or other data items.

In yet another example, the broadcaster computing device 130 transmits a request for data to the receiver computing device 110 via the network 120. For example, the broadcaster computing device 130 transmits a request for data comprising a request for the user 101 to select one or more data comprising one or more of images, documents, files, text, or other data for transmission from the receiver computing device 110 to the broadcaster computing device 130. In an example, the broadcaster computing device 130 receives the data from the receiver computing device 110. In an example, the receiver computing device 110 displays the request for data via the user interface 111 of the receiver computing device 110. For example, the receiver computing device 110 may display a menu of user interface 111 objects associated with one or more images, files, text, or other data selectable by the user 101 that enable the user 101 to indicate one or more data items the user 101 wishes to transmit to the broadcaster computing device 130. In this example, the user 101 selects one or more of the user interface 111 objects and the receiver computing device 110 receives an indication of the selection of the one or more user interface 111 objects indicating one or more corresponding data items the user 101 wishes to transmit to the broadcaster computing device 130. In an example, in response to receiving an indication of the selection of the one or user interface 111 objects indicating one or more corresponding data items, the receiver computing device 110 transmits the selected one or more corresponding data items to the broadcaster computing device 130. In this example, the broadcaster computing device 130 receives the one or more corresponding data items from the receiver computing device 110. In an example, the receiver computing device 110 transmits the selected corresponding data items to the broadcaster computing device 130 via the network 120 connection established by the account management system 140.

Other Examples

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to display broadcaster computing device status information via graphical user interfaces of receiver computing devices, comprising, by a first computing device:
   receiving, from one or more computing devices, an audio token not present signal score threshold determined from aggregate signal score data of one or more second computing devices of a same model as the first computing device,
   receiving audio token data via a microphone component;
   determining a signal score for the received audio token data;
   determining whether the signal score for the received audio token data is less than the audio token not present signal score threshold; and
   in response to determining whether the signal score for the received audio token data is less than the audio token not present signal score threshold, displaying, via a graphical user interface, one or more outputs indicating a broadcaster computing device status in accordance with the determination of whether the signal score for the received audio token data is less than the audio token not present signal score threshold.

2. The computer-implemented method of claim 1, further comprising, by the first computing device:
   determining that the signal score for the received audio token data is less than the audio token not present signal score threshold,
   wherein the first computing device displays a broadcaster not present status output via the graphical user interface and an instruction to configure a broadcaster computing device to broadcast the audio token data in accordance with determining that the signal score for the received audio token data is less than the audio token not present signal score threshold.

3. The computer-implemented method of claim 1, wherein determining the signal score comprises determining an energy of the received audio token data.

4. The computer-implemented method of claim 1, further comprising, by the one or more computing devices:
   receiving from each of the one or more second computing devices of the model, one or more second signal scores;
   grouping the received signal scores and the received second signal scores into a pre-token category and a token phase category;
   determining a pre-token phase baseline curve based on a distribution of the pre-token category signal scores; and
   determining the audio token not present signal score threshold corresponding to a particular signal score along the pre-token phase baseline curve resulting in a ratio of audio token present and audio token not present probabilities that is equal to a predetermined confidence value.

5. The computer-implemented method of claim 1, wherein the one or more outputs comprise one or more of a text display, a graphical display, an image display, a video display, a vibration, and a vibration pattern.

6. The computer-implemented method of claim 1, further comprising, by the first computing device:
   receiving from the one or more computing devices, an audio token present signal score threshold determined from the aggregate signal score data of the one or more second computing devices of the same model as the first computing device;
   determining that the signal score for the received audio token data is greater than the audio token not present signal score threshold;
   determining that the signal score for the received audio token data is greater than the audio token present signal score threshold; and
   in response to determining that the signal score for the received audio token data is greater than the audio token present signal score threshold, displaying, via the graphical user interface, one or more outputs indicating a broadcaster computing device probably present status comprising an instruction to move the first computing device to within a closer proximity of the broadcaster computing device.

7. The computer-implemented method of claim 1, further comprising, by the first computing device:
   receiving from the one or more computing devices, an audio token present signal score threshold determined from the aggregate signal score data of the one or more second computing devices of the same model as the first computing device;
   determining that the signal score for the received audio token data is greater than the audio token not present signal score threshold;
   determining that the signal score for the received audio token data is less than the audio token present signal score threshold; and
   in response to determining that the signal score for the received audio token data is greater than the audio token present signal score threshold, displaying, via the graphical user interface, one or more outputs indicating a broadcaster computing device probably not present status comprising an instruction to move the first computing device to within a closer proximity of the broadcaster computing device or to configure a broadcaster computing device to broadcast the audio token data.

8. One or more non-transitory computer-readable media that store instructions that when executed by one or more processors cause the one or more processors to perform operations, the operations comprising:
   receiving an audio token not present signal score threshold determined from aggregate signal score data of one or more second computing devices of a same model,
   receiving audio token data via a microphone component;
   determining a signal score for the received audio token data;
   determining whether the signal score for the received audio token data is less than the audio token not present signal score threshold; and
   displaying, via a graphical user interface, in response to determining whether the signal score for the received audio token data is less than the audio token not present signal score threshold, one or more outputs indicating a broadcaster computing device status in accordance with the determination of whether the signal score for the received audio token data is less than the audio token not present signal score threshold.

9. The one or more non-transitory media of claim 8, further comprising instructions to:
determine that the signal score for the received audio token data is less than the audio token not present signal score threshold,
wherein displaying the one or more outputs comprises displaying a broadcaster not present status output via the graphical user interface and an instruction to configure a broadcaster computing device to broadcast the audio token data in accordance with determining that the signal score for the received audio token data is less than the audio token not present signal score threshold.

10. The-one or more non-transitory media of claim 8, wherein determining the signal score comprises determining an energy of the received audio token data.

11. The one or more non-transitory media claim 8, wherein the audio token data is received via ultrasound communication.

12. The one or more non-transitory media of claim 8, wherein the one or more outputs comprise one or more of a text display, a graphical display, an image display, a video display, a vibration, and a vibration pattern.

13. The one or more non-transitory media claim 8, further comprising instructions to:
receive an audio token present signal score threshold determined from the aggregate signal score data of the one or more second computing devices of the same model;
determine that the signal score for the received audio token data is greater than the audio token not present signal score threshold;
determine that the signal score for the received audio token data is less than the audio token present signal score threshold; and
display, via the graphical user interface in response to determining that the signal score for the received audio token data is greater than the audio token present signal score threshold, one or more outputs indicating a broadcaster computing device probably not present status comprising an instruction to move the computer to within a closer proximity of the broadcaster computing device or to configure a broadcaster computing device to broadcast the audio token data.

14. The-one or more non-transitory media claim 8, further comprising instructions to:
receive an audio token present signal score threshold determined from aggregate signal score data of the one or more second computing devices of the same model;
determine whether the signal score for the received audio token data is greater than the audio token not present signal score threshold; and
in response to determining that the signal score for the received audio token data is greater than the audio token present signal score threshold, displaying, via the graphical user interface, one or more outputs indicating a broadcaster computing device probably present status comprising an instruction to move the first computing device to within a closer proximity of the broadcaster computing device.

15. A system to display broadcaster computing device status information via graphical user interfaces of receiver computing devices, comprising:
a storage device;
a microphone component;
a graphical user interface; and
a processor communicatively coupled to the storage device, the microphone component, and the graphical user interface, wherein the processor executes instructions that are stored in the storage device to cause the system to:
receive an audio token not present signal score threshold determined from aggregate signal score data of one or more second computing devices of a same model,
receive audio token data via the microphone component;
determine a signal score for the received audio token data;
determine whether the signal score for the received audio token data is less than the audio token not present signal score threshold; and
display, via the graphical user interface, in response to determining whether the signal score for the received audio token data is less than the audio token not present signal score threshold, one or more outputs indicating a broadcaster computing device status in accordance with the determination of whether the signal score for the received audio token data is less than the audio token not present signal score threshold.

16. The system of claim 15, wherein the processor is further configured to execute instructions stored in the storage device to cause the system to determine that the signal score for the received audio token data is less than the audio token not present signal score threshold, wherein displaying the one or more outputs comprises displaying a broadcaster not present status output via the graphical user interface and an instruction to configure a broadcaster computing device to broadcast the audio token data in accordance with determining that the signal score for the received audio token data is less than the audio token not present signal score threshold.

17. The system of claim 15, wherein determining the signal score comprises determining an energy of the received audio token data.

18. The system of claim 15, wherein the one or more outputs comprise one or more of a text display, a graphical display, an image display, a video display, a vibration, and a vibration pattern.

19. The system of claim 15, wherein the processor is further configured to execute instructions stored in the storage device to cause the system to:
receive an audio token present signal score threshold determined from the aggregate signal score data of the one or more second computing devices of the same model;
determine that the signal score for the received audio token data is greater than the audio token not present signal score threshold;
determine that the signal score for the received audio token data is greater than the audio token present signal score threshold; and
display, via the graphical user interface in response to determining that the signal score for the received audio token data is greater than the audio token present signal score threshold, one or more outputs indicating a broadcaster computing device probably present status comprising an instruction to move the computer to within a closer proximity of the broadcaster computing device.

20. The system of claim 15, wherein the processor is further configured to execute instructions stored in the storage device to cause the system to:
receive an audio token present signal score threshold determined from the aggregate signal score data of the one or more second computing devices of the same model;
determine that the signal score for the received audio token data is greater than the audio token not present signal score threshold;
determine that the signal score for the received audio token data is greater than the audio token present signal score threshold; and
display, via the graphical user interface in response to determining that the signal score for the received audio token data is greater than the audio token present signal score threshold, one or more outputs indicating a broadcaster computing device probably present status comprising an instruction to move the computer to within a closer proximity of the broadcaster computing device.

* * * * *